United States Patent [19]
Barkans

[11] Patent Number: 6,057,855
[45] Date of Patent: May 2, 2000

[54] METHOD AND APPARATUS FOR PROVIDING POLYGON PIXEL SUB-SAMPLE INFORMATION USING INCREMENTAL MEANS

[75] Inventor: Anthony C Barkans, Redmond, Wash.

[73] Assignee: Hewlett-Packard Company, Palo Alto, Calif.

[21] Appl. No.: 08/887,441

[22] Filed: Jul. 2, 1997

[51] Int. Cl.$^7$ .................................................. G06T 11/60
[52] U.S. Cl. ...................... 345/435; 345/431; 345/432; 345/441; 345/136; 345/137; 345/138
[58] Field of Search .................................. 345/435, 431, 345/432, 441, 136–138

[56] References Cited

U.S. PATENT DOCUMENTS

| | | | |
|---|---|---|---|
| 5,123,085 | 6/1992 | Wells et al. | 345/421 |
| 5,381,519 | 1/1995 | Brown et al. | 345/432 |
| 5,668,940 | 9/1997 | Steiner | 345/429 |
| 5,777,629 | 7/1998 | Baldwin | 345/506 |
| 5,821,949 | 10/1998 | Deering | 345/505 |
| 5,903,276 | 5/1999 | Shiraishi | 345/431 |

FOREIGN PATENT DOCUMENTS

| | | | |
|---|---|---|---|
| 090102048A | 4/1997 | Japan | G06T 11/40 |
| 2243063A | 10/1991 | United Kingdom | G09G 5/28 |
| 2245805A | 1/1992 | United Kingdom | G09G 1/14 |
| 2285377A | 7/1995 | United Kingdom | G06T 5/20 |

OTHER PUBLICATIONS

Anthony C. Barkans, "Hardware–Assisted Polygon Anti-aliasing", IEEE Computer Graphics and Applications 80–88 (Jan. 1991).

Kurt Akeley, "Reality Engine Graphics", SIGGRAPH Computer Graphics Proceedings, Annual Conference Series 109–116 (Aug. 1993).

*Primary Examiner*—Mark R. Powell
*Assistant Examiner*—Motilewa Good-Johnson

[57] ABSTRACT

A method and apparatus for generating a mask identifying a number of subpixels that are covered by a primitive includes the process of apportioning an image, comprising a plurality of scan lines into a plurality of sub-scan lines, such that a number of sub-scan lines crosses each pixel. A sample point is placed on at least one of the sub-scan lines. To determine the number of samples that are covered by a primitive, edge stepping is used to step along each edge of the primitive, generating a sub-scan line coordinate for the edge. The edge stepping hardware is used for stepping either on a sub-scan line granularity, for operation in anti-aliased mode, or on a scan line granularity, for operation in aliased mode. In anti-aliased mode, as each edge sub-scan line coordinate is generated, it is compared against the coordinates of a sample point on that sub-scan line, to determine whether or not that sample point is covered by the primitive. A mask is generated for each pixel, with each bit of the mask corresponding to one of the sub-scan line samples. A bit in the mask is set if the subsample is covered by the primitive. Thus, a mask representing covered subsamples is provided by using incremental techniques to approximate pixel coverage without the complex hardware and lookup tables used in the prior art.

22 Claims, 16 Drawing Sheets

$$[x'y'z'w'] = [x\ y\ z\ w] \times \begin{bmatrix} a_1 & a_2 & a_3 & a_4 \\ b_1 & b_2 & b_3 & b_4 \\ c_1 & c_2 & c_3 & c_4 \\ d_1 & d_2 & d_3 & d_4 \end{bmatrix}$$

HOMOGENOUS　　OBJECT　　　　XFORM
DEVICE　　　COORDINATES　　MATRIX
COORDINATES

FIG. 4A

CALCULATE PERSPECTIVE DIVIDED COORDINATES (ONLY IF PERSPECTIVE IS ON):

40 {
```
v0.x = v0.x • v0.wrecip   v0.y = v0.y • v0.wrecip   v0.z = v0.z • v0.wrecip
v1.x = v1.x • v1.wrecip   v1.y = v1.y • v1.wrecip   v1.z = v1.z • v1.wrecip
v2.x = v2.x • v2.wrecip   v2.y = v2.y • v2.wrecip   v2.z = v2.z • v2.wrecip
```

CALCULATE ALL THE EDGE DELTAS:

42 {
```
mnx2 = v0.x - v2.x/*edge1dx*/      nx1 = v1.x - v0.x/*edge2dx*/
dxe3 = v2.x - v1.x/*edge3dx*/
mny2 = v0.y - v2.y/*edge1dy*/      ny1 = v1.y - v0.y/*edge2dy*/
dye3 = v2.y - v1.y/*edge3dy*/
mnz2 = v0.z - v2.z/*edge1dz*/      nz1 = v1.z - v0.z/*edge2dz*/
mnred2 = v0.red - v2.red/*edge1dred*/     nred1 = v1.red - v0.red/*edge2dred*/
mngreen2 = v0.green - v2.green/*e1dgreen*/  ngreen1 = v1.green - v0.green/*e2dgreen*/
mnblue2 = v0.blue - v2.blue(edge1dblue)   nblue1 = v1.blue - v0.blue(edge2dblue)
```

44 {
CALCULATE ALL THE EDGE SLOPES:

```
edge1_slope = mnx2 + mny2
edge2_slope = nx1 + ny1    edge3_slope = dxe3 + dye3
```

METHOD AND APPARATUS FOR PROVIDING POLYGON PIXEL SUB-SAMPLE INFORMATION USING INCREMENTAL MEANS

FIELD OF THE INVENTION

This invention relates generally to the field of computer systems and more specifically to a method and apparatus for anti-aliasing in computer graphics systems.

BACKGROUND OF THE INVENTION

Computer graphics systems are commonly used for displaying graphical representations of two or three-dimensional objects on a two-dimensional display screen. A conventional computer graphics system includes a host computer for providing instructions and data to a graphics device that includes the display screen. By forwarding commands and data to the graphics device, the host computer controls the display of images on the display screen.

In typical computer graphics systems, an object to be represented on a display screen is broken down into a number of primitives. Primitives are basic components of a graphics picture such as points, lines, vectors and polygons (e.g., triangles). Typically, graphics software executing on the host computer operates in conjunction with the graphics device to render (draw) graphics primitives on the display device.

To render a two or three-dimensional object, the host computer provides a collection of primitive data that collectively defines the object to be rendered. For example, the primitive data that defines a triangle may include the x,y,z coordinates of the three-dimensional object space and the red, green, blue (R,G,B) color values for each vertex of the triangle. Rendering hardware in the graphics device interpolates the primitive data to determine which pixels on the display screen are used to render the triangle, and to determine the red, green and blue color values for each of these pixels.

The process of converting primitive data, e.g., a line, point, or polygon, to a corresponding array of pixel data is known as "scan conversion." The scan conversion process used in a graphics system is invoked quite often, typically thousands of times for each image that is created or modified. Hence, it is desirable to have the scan conversion process execute as rapidly as possible. However, speed of execution often requires some tradeoff against image quality.

Some scan conversion methods are fast, but the primitives that are rendered appear to have jagged edges. The appearance of jagged edges results from a selection of a sub-optimal color for the pixels at the edges of the primitive. Primitives that have jagged edges as a result of their transformation into pixel data are often referred to as "aliased." When a scan converter operates in a mode that does not attempt to correct jagged edges, it is said to be operating in aliased mode.

For example FIG. 1 illustrates a primitive (i.e., triangle 74) that has been rendered by a scan converter operating in aliased mode. When providing a primitive in aliased mode, a fast determination is made as to whether or not each pixel is on (i.e., covered by the primitive), or off (not covered by the primitive). The basic determination is made by evaluating the status of each pixel at an origin point, such as point 1 in FIG. 1. The address, or origin, of each pixel in the x,y coordinate space is defined by the coordinates at the x,y intersections of the grid in the upper right hand corner of the pixel. If the origin point is covered by the primitive, the pixel is on. If not, the pixel is off. Because only a single color sample is taken per pixel, the rendering of the primitive in aliased mode is performed quickly. However, as can be seen in the example of FIG. 1, while aliased primitives may often be rendered quickly, the resulting primitive is often of poor quality.

The process of providing a primitive having the appearance of smoothed edges is commonly referred to as "anti-aliasing." Scan conversion algorithms that operate in anti-aliased mode are generally slower or require significantly more hardware because more calculations are performed at each pixel to select an appropriate color. However, primitives rendered using anti-aliasing have smoother edges as a result of more optimal color selection criteria. One method of anti-aliasing uses multi-point sampling within each pixel to select a more optimal color for pixels at the edges of a primitive. In selecting a more optimal color, multi-point sampling blends the color of the background, including any underlying geometry, with the color of the primitive to smooth jagged edges of the primitive. In multi-point sampling, each pixel is generally sampled at multiple sub-pixel locations within each pixel to determine the portion of the pixel that is covered by the primitive. A single blended color for the pixel is then determined based upon the number of subpixels that are covered by the primitive.

For example, if an edge of a red primitive covers a black background at a given pixel such that 50% of the sub-pixel sample locations are covered, then the color for the pixel may be selected as a mixture of 50% red and 50% black. Thus, by blending the color of the pixels along the edges of a primitive, a smooth transition between the primitive and the background is provided.

One technique used to provide anti-aliased images using multi-point sampling is provided in the REALITY-ENGINE™ graphics device, which is commercially available from Silicon Graphics Computer Systems, U.S.A. The Silicon Graphics device receives plane equations representing primitives, and solves for the individual parameters of each plane equation. The plane equation parameters are used to access a location in a look up table that stores patterns of sub-pixels for each possible combination of parameter values. The pattern of sub-pixels in the lookup table is used to identify the sub-pixels that are covered by the primitive represented by the plane equation at each pixel.

The mathematical calculations used to solve the plane equations are complex. To solve the plane equation parameters at a high performance, many pixel processors are required. Because the mathematical calculations and look-ups are performed in hardware, the Silicon Graphics system is capable of providing sub-pixel data relatively quickly. However, a drawback of the above method is that the hardware required to perform the mathematical functions is expensive in terms of gate count, thus increasing the cost and size of the graphics circuitry.

It is an object of the present invention to provide an improved method and apparatus for determining sub-pixel coverage of a primitive for use in anti-aliasing operations.

SUMMARY OF THE INVENTION

According to one aspect of the invention, a method of approximating a percentage of at least one pixel on a graphics system display screen that is covered by a primitive to be displayed on the display screen is provided. The method includes the steps of apportioning the at least one display pixel into a plurality of sub-scan lines that define a plurality of subsample points for the at least one pixel, with each of the plurality of subsample points being located on a corresponding one of the plurality of sub-scan lines. Stepping is performed between the plurality of sub-scan lines of the at least one pixel. At each one of the plurality of sub-scan lines it is determined whether the corresponding subsample point on the one of the plurality of sub-scan lines is covered by the primitive. The percentage of the at least one pixel covered by the primitive is approximated based upon the number of the plurality of subsample points of the at least one pixel that are covered by the primitive.

According to another aspect of the invention, in a graphics system capable of operating in an aliased mode for rendering primitives and in anti-aliased mode for rendering the primitives with relatively smoother edges, an edge stepper for generating coordinate data for pixels on a display device that represent a primitive on the display device is provided. The edge stepper receives primitive data including a first and second pair of edge coordinates and a slope value for at least one edge of the primitive to be rendered on the display. The edge stepper includes an adder, for incrementing one of the first endpoint coordinates by an increment value to provide an edge x and an edge y coordinate of the at least one edge of the primitive being rendered, where the increment value is less than a size of a display pixel.

According to another aspect of the invention, a graphics device for displaying an image on a display device coupled to a host processor, where the display device comprises a plurality of scan lines and each of the scan lines comprises a plurality of pixels, is provided. The graphics device includes a graphics accelerator, coupled to receive data from the host processor representing a plurality of graphics primitives. The graphics accelerator generates edge equations for each primitive, with the edge equations including, for at least one edge of the primitive, endpoint coordinate data identifying endpoints of the at least one edge of the primitive and slope data identifying rate of change of the at least one edge. In addition, the graphics device includes a scan converter, coupled to receive the edge equations from the graphics accelerator and to translate the plane equations into coordinates of pixels of the display device. The scan converter includes an edge stepper to step from one of the coordinates of one of the endpoints of the edge to another endpoint of the edge to generate pixel coordinates for the edge, wherein a size of step of the edge stepper is less than the size of a display pixel.

BRIEF DESCRIPTION OF THE DRAWING

FIG. 4A is an example of edge equations that are generated by the graphics accelerator of FIG. 2;

DETAILED DESCRIPTION OF ILLUSTRATIVE EMBODIMENTS

The present invention is directed to an improved method and apparatus for anti-aliasing primitives in a graphics device that is coupled to a display screen on which an image is rendered. The display screen includes a number of scan lines, with each scan line including a number of display pixels. The graphics device includes software and hardware tools for drawing, or rendering, a primitive on the display. The graphics tools generate a starting edge coordinate and slope information for each primitive. In aliased mode, a primitive is rendered by stepping along the display screen scan lines and identifying coordinates of display pixels along edges of the primitive. To perform anti-aliasing of a primitive using multi-point sampling, in one embodiment of the present invention an image comprising a plurality of scan lines is subdivided into a plurality of sub-scan lines, such that a number of sub-scan lines crosses each pixel. A sample point is placed on each sub-scan line such that each pixel includes multiple sample points that can be used to determine how much of the display pixel is covered by the primitive. To determine the number of samples that are covered by a primitive, an edge stepping technique is used to step along each edge of the primitive, generating a sub-scan line coordinate for the edge. As each edge sub-scan line coordinate is generated, it is compared against the coordinates of a sample point on that sub-scan line, to determine whether or not that sample point is covered by the primitive. A mask is generated for each pixel, with each bit of the mask corresponding to one of the sub-scan line samples and indicating whether the corresponding sub-sample is covered by the primitive. As a result, by using an incremental algorithm where stepping increments and directions are based upon parameters that are pre-generated in software, the position of pixel edges may be determined for evaluating pixel coverage values without requiring the complex hardware used in the prior art.

Figure 2:
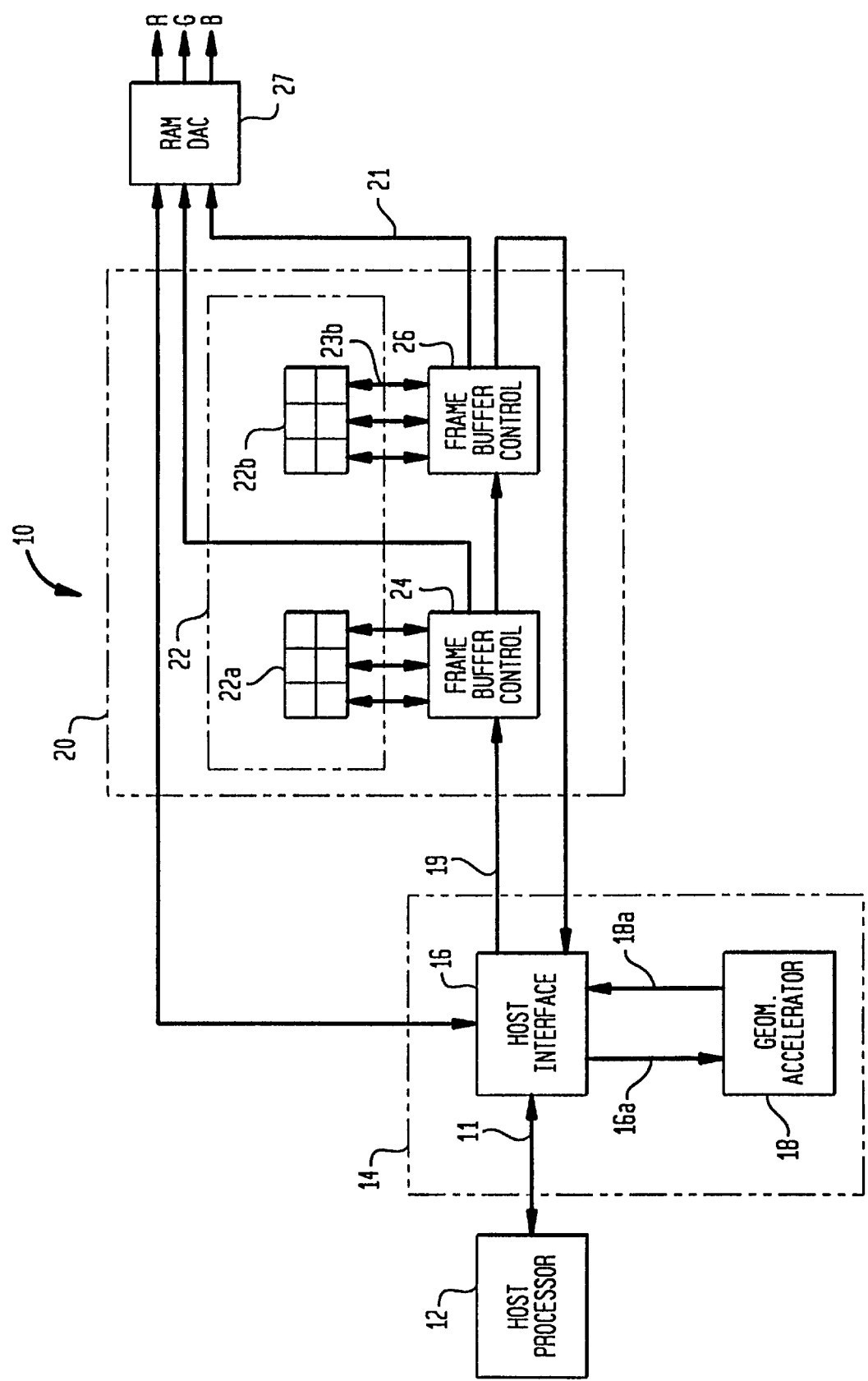
FIG. 2 is a block diagram of an illustrative graphics system in which the present invention can be employed.

The concepts of the present invention will now be described with reference to the attached drawings, where like numbers refer to like elements in the drawings. FIG. 2 is a block diagram showing an exemplary computer graphics system 10 in which the anti-aliasing method and apparatus of the present invention can be employed. The computer graphics system 10 includes a host processor 12, a front end subsystem 14 and a frame buffer subsystem 20. The front end subsystem 14 receives primitive data from the host processor 12 over bus 11. As discussed above, each primitive is typically specified by x, y, z coordinate data, R,G,B color data, and texture data for certain portions of the primitives, such as the vertices when the primitive is a triangle. The front end subsystem 14 transforms the primitive data into edge equations for each primitive, identifying coordinates of each of the vertices of the primitive and slopes of the edges of the primitive, and transfers these edge equations to the frame buffer subsystem 20.

The frame buffer subsystem 20 interpolates the edge equation data received from the front end subsystem 14 for each primitive to compute the pixel addresses, in display screen coordinates, and pixel color data that are used to represent each primitive on the display screen. The pixel color data includes bits identifying the red, green and blue color components of the pixel, and are stored in a frame buffer memory 22. The pixel color data are forwarded out of frame buffer memory 22 and through a Random Access Memory Digital to Analog Converter (RAMDAC) 27 which converts the binary color data stored in frame buffer memory 22 into analog red, green and blue signals for display on a display device (not shown). It should be understood that the invention is not limited to any analog display device, and that any other type of display device (e.g., digital, monochromatic or gray scale) may alternatively be used.

In the illustrative system of FIG. 2, front end subsystem 14 includes a host interface 16 and a three-dimensional (3-D) geometry accelerator 18. Host interface 16 receives the x, y, z vertex coordinate and color primitive data over bus 11 from host processor 12. This data is then provided from host interface 16 to geometry accelerator 18 over bus 11. Geometry accelerator 18 performs conventional geometry accelerator functions, such as three-dimensional transformation, lighting, clipping, and perspective divide operations, as well as generating edge equations in floating point format. In systems where a geometry accelerator is not provided, the edge equations are alternatively provided by the host processor. In the embodiment of FIG. 2, the edge equations are provided by geometry accelerator 18 over bus 18a to host interface 16 which forwards this edge equation data on bus 19 to the frame buffer subsystem 20.

Figures 3, 4:
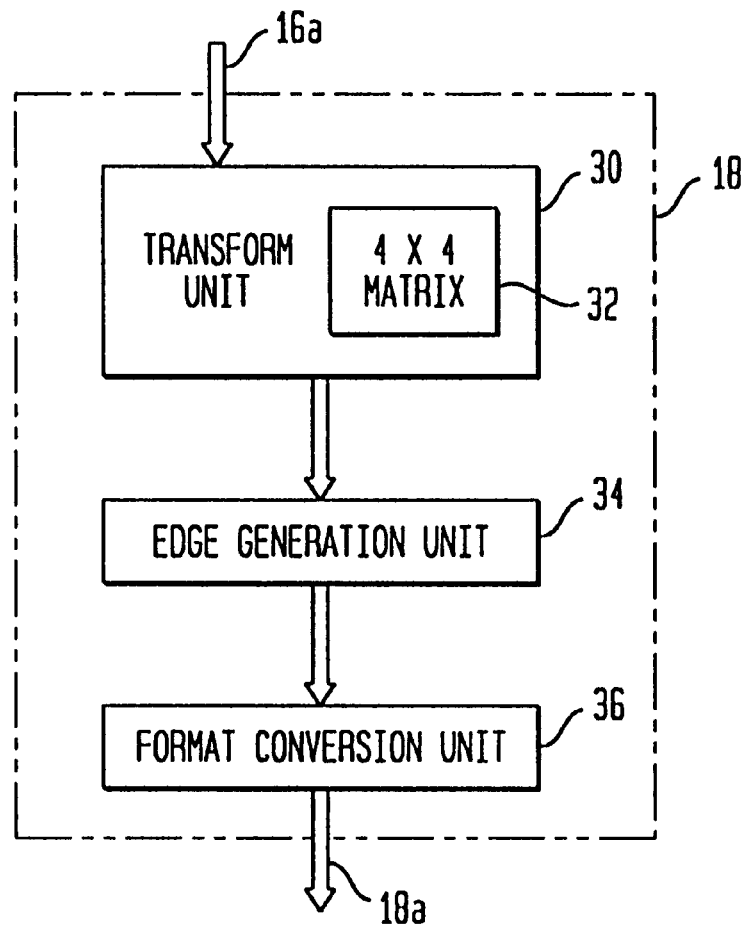
FIG. 3 is a block diagram of a graphics accelerator for use in the graphics system of FIG. 2.
FIG. 4 is an example of a transform matrix used for scaling primitive data in one embodiment of the present invention.

Referring now to FIG. 3, a block diagram of a portion of the geometry accelerator 18 is shown including a transform unit 30, an edge generation unit 34 and a format conversion unit 36. The transform unit 30 receives, from the host interface 16 over bus 16A, coordinate and color data for each endpoint of each primitive. A triangle primitive, for example, is represented by three vertex points, and thus will be represented by three vertex coordinates. The transform unit 30 includes a transform matrix 32 that is used to geometrically transform the input coordinates of primitive vertices into coordinates for representing the primitive on a display device. Referring briefly to FIG. 4, an example of the transform matrix 32 is shown including a number of rows and columns of matrix values a1–a4 . . . d1–d4. The matrix values are used to transform coordinates [x,y,z,w] of every into coordinates [x',y',z',w'] of a display device, where x, y are the pixel coordinates along the x and y axes, respectively, where z is the pixel coordinate along the z axis and thus provides visual depth information about the pixel, and where w is the pixel perspective, i.e., the size of the primitive relative to the size of the display. The matrix is device dependent, and thus the values in the matrix vary based on the number of pixels capable of being displayed on the display device. In addition, the transform matrix 32 may be used to scale a primitive by a scale value S by multiplying the appropriate matrix entries a1–a4, b1–b4, c1–c4 and d1–d4 by S using standard matrix multiplication techniques. This capability is provided in many graphics system to scale images for providing zoom capability.

Once the object coordinates of the primitive have been transformed to coordinates for the display device, the transformed primitive data is forwarded to the edge generation unit 34 (FIG. 3). The edge generation unit 34 converts received primitive vertex data into edge equations representing the primitive. Referring now briefly to FIG. 4A, an example of some edge equations generated for a triangle are shown. The vertex coordinates received by the transform unit 30 from the host interface 16 are not yet scaled to account for the perspective of the primitive, i.e., the size of the primitive relative to the size of the display. Thus, the equations in group 40 are used to scale the x, y, and z coordinates of each of the vertexes v0, v1 and v2 by a perspective amount "wrecip" (which is equal to 1/w). Scaling by perspective allows for the scaling of an individual primitive. In contrast the transform matrix scales the entire image on the display. The equations in group 42 are then used to calculate the deltas of the edges. The deltas include length information identifying the overall length of the edge and color delta information identifying the change in color along the edge. The equations in group 44 are used to calculate the slopes of the edges of the primitive.

During generation of the edge equations, edge assignments are also made. For example, when using triangles, the edge of the primitive with the longest y axis span is selected as edge one, the edge adjoining edge one at the lowest Y coordinate is edge two, and the remaining edge is edge three Based on the edge assignments, a direction value is generated, indicating an x axis direction proceeding from edge one to edge two. As described later herein, this direction value is used in one embodiment of the present invention by the frame buffer subsystem 20 for determining coordinates of pixels that are covered by the primitive.

The edge equations and edge assignments are forwarded to format conversion unit 36, which re-formats the edge equations by performing a floating point to fixed point conversion to simplify later computations using the equations. The above edge equation data is forwarded out of the geometry accelerator 18 (FIG. 2) over bus 18a to host interface 16. The host interface 16 then forwards the edge equation data to the frame buffer subsystem 20.

In the computer graphics system shown in FIG. 2, the frame buffer subsystem 20 includes two frame buffer controllers 24 and 26, each of which controls the display of one portion (22a, 22b) of the frame buffer memory 22 via control lines 23A and 23B, respectively. Frame buffer controller 24 controls the contents and display of data in the portion 22a of the frame buffer memory, and frame buffer controller 26 controls the contents and display of data in the portion 22b of frame buffer memory. Although two memory controllers are shown, other embodiments including, for example, one memory controller, or greater than two memory controllers may also be used. Although each frame buffer controller 24 and 26 handles primitive data destined for different addresses in the frame buffer memory 22, the remaining functionality of the controllers is substantially identical. As such, only one frame buffer controller will now be described in detail below.

Figure 5:
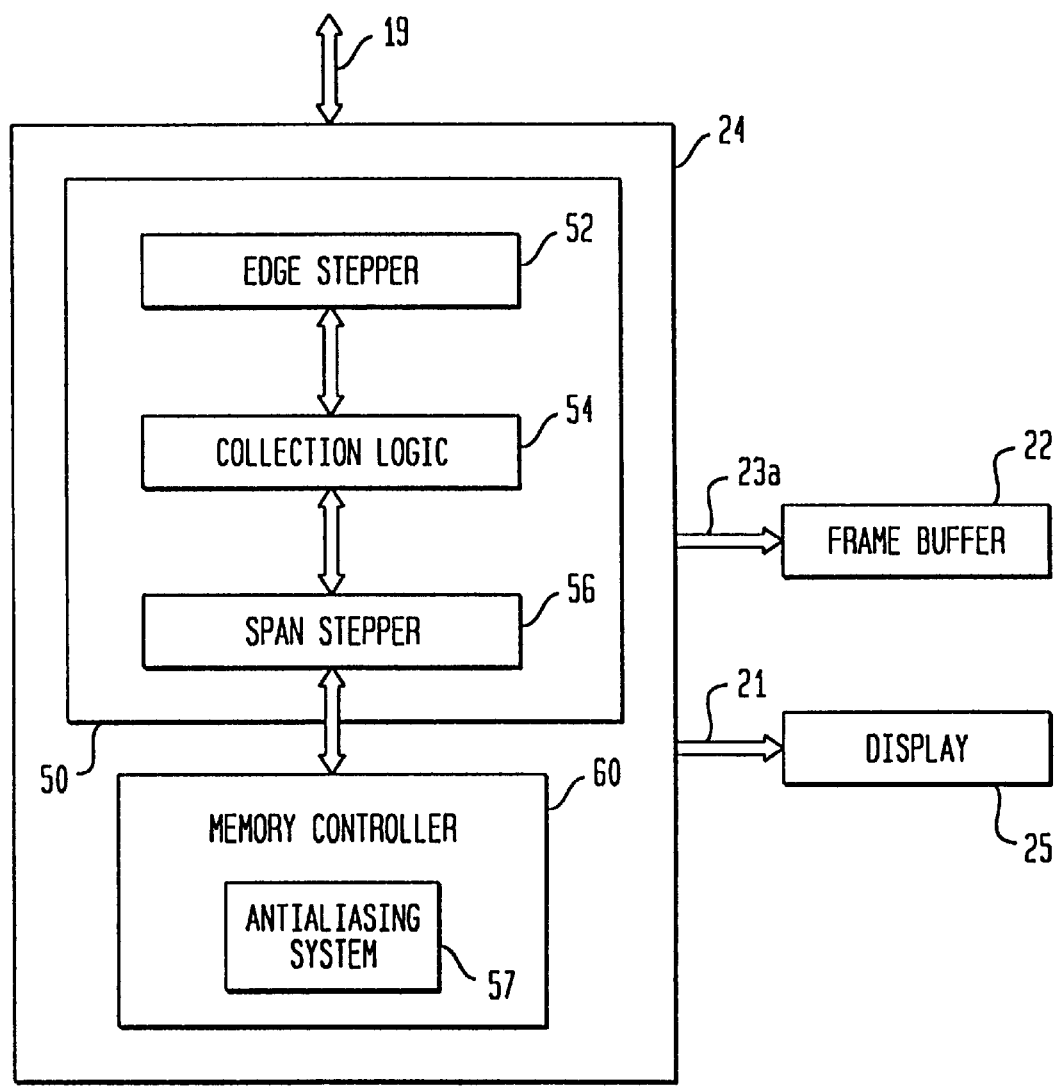
FIG. 5 is a block diagram of one embodiment of a frame buffer controller of a graphics system such as that shown in FIG. 2 that employs the present invention.

Referring to FIG. 5, an illustrative arrangement of a frame buffer controller 24 in accordance with one embodiment of the present invention is shown including two functional units, a scan conversion unit 50 and a memory controller 60. The scan conversion unit 50 controls the translation of the edge equations into individual pixel data. The memory controller 60 controls the writing of the pixel data received from the scan conversion unit 50 into frame buffer memory 22. In addition, the memory controller includes logic 57 for performing anti-aliasing using data from the scan conversion unit 50 relating to multi-point sampling of primitives. In one embodiment of the invention, the memory controller 60 is implemented as described in U.S. patent application Ser. No. 08/692,350, entitled "Anti-aliasing System and Method that Minimize Memory Requirements and Memory Accesses by Storing a Reduced Set of Subsample Information", filed on Aug. 5, 1996 and incorporated by reference herein. The memory controller described in the above patent application describes an anti-aliasing method that uses subsample coverage information to determine color and perceived depth information (i.e, the z component) for each pixel to be rendered on the display device. Thus, the present invention may be used to provide the subsample coverage information that is used in the anti-aliasing method described in the '350 patent application. However, the method and apparatus for generating subsample information described herein can also be used with memory controllers implemented in other ways, and thus the present invention is not limited to the use with the '350 memory controller.

As mentioned above, the scan conversion unit 50 forwards pixel coordinate and color data to the memory controller. According to one aspect of the invention, the scan conversion unit 50 also forwards a subsample mask to the memory controller. Each of the bits of the mask corresponds to one subsample of an associated pixel. The subsample mask is used during anti-aliasing to select an appropriate color value for the pixel. Before describing how the scan conversion unit 50 determines the subsample mask, a brief description of the operation of multi-point sampling will first be provided.

Figure 6:
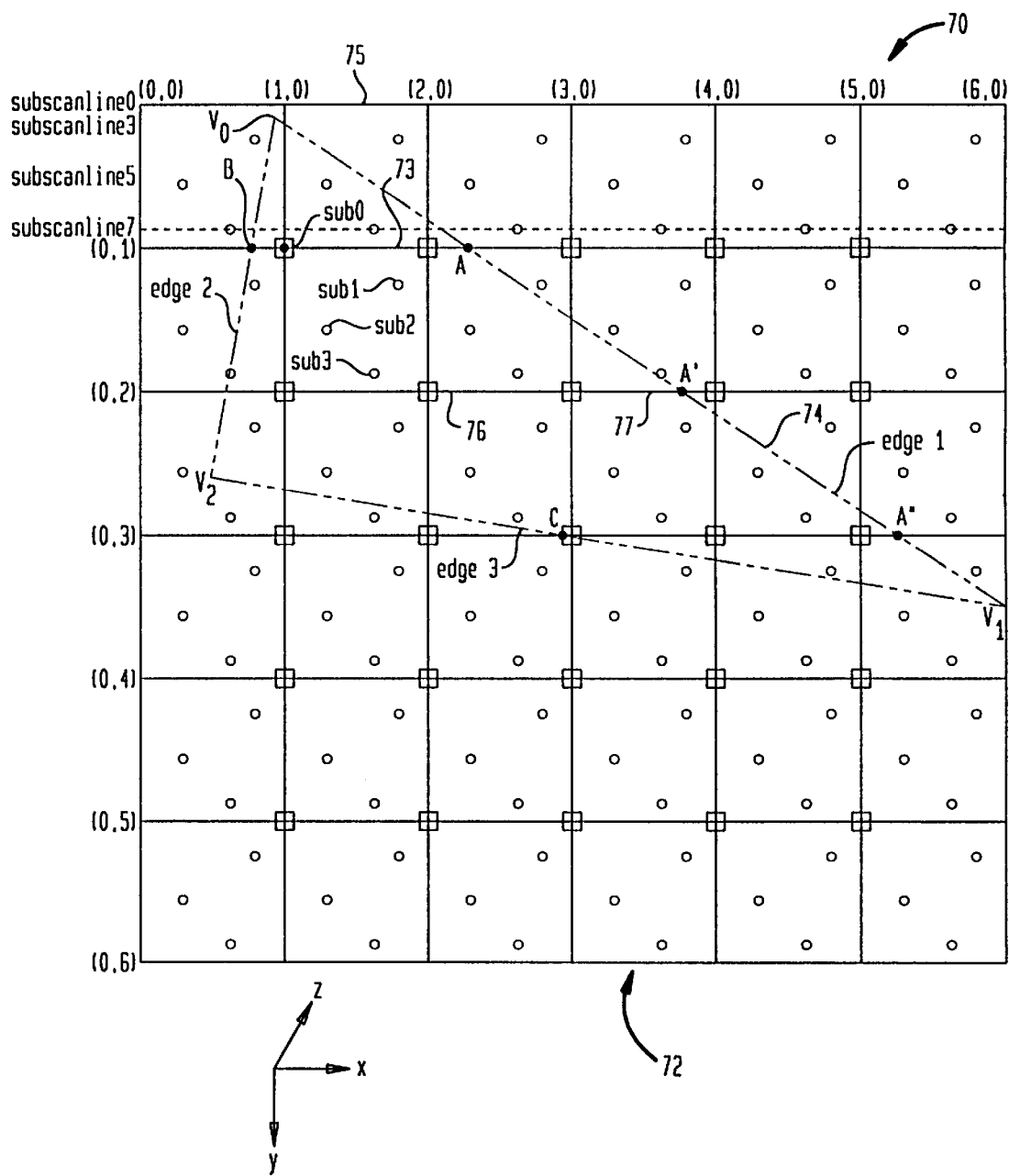
FIG. 6 is an illustration of a primitive drawn on a pixel grid.

Referring now to FIG. 6, a portion of a display screen 70 is shown including a six row by six column pixel grid. The lines of the grid are drawn at integer values for both x and y coordinates in an x,y,z coordinate system of the display. Each of the horizontal lines x represents a scan line for the display. Scan line zero is at address (0,0), scan line one is at address (0,1) and so forth. In accordance with one embodiment of the invention, a number of subsamples are included within each pixel and are shown as a number of dots labeled sub0–sub3 in pixel 73. The address, or origin, of each pixel in the x,y coordinate space is defined by the coordinates at the x,y intersections of the grid. Each pixel includes the subsamples within the pixel extending in an increasing x and increasing y direction to the next grid intersection. Thus, pixel (1,0) includes subsamples in grid block 75.

The primitive of FIG. 6 is a triangle 74 drawn in a first color on a background of a second color. As described above with reference to FIG. 1, if the triangle 74 were rendered in aliased mode, each pixel where the pixel origin point is covered by the primitive would be rendered in the first color, while pixels where the pixel origin point is not covered by the primitive would be rendered in the second color. The resulting aliased primitive would be rendered with jagged edges, thus providing a sub-optimal image.

To smooth the edges of the primitive, the primitive may be rendered using an anti-aliased technique known as multi-point sampling. In multi-point sampling, each pixel is sampled at multiple coordinates within the pixel to provide a number of pixel subsamples. During multi-point sampling, when selecting a color for displaying each of the pixels, the number of subsamples of the pixel that are covered by the primitive is used in conjunction with other information (such as color data and z depth) to determine the color of the pixel. In the example of FIG. 6, the pixel 75 at x,y coordinates (1,0) has two subsamples covered by the primitive. Thus, the color of the pixel would be a mixture of 50% of the primitive color, and 50% of the background color.

Multi-point sampling is therefore useful in anti-aliasing because it provides information that is used to modulate color at the edges of a primitive to thereby reduce the appearance of jagged edges. Multi-point sampling is also useful for displaying objects that are smaller than the size of pixels. For example, if an object is smaller than the size of the pixel, and does not cover a single sample point of the pixel it is not displayed in aliased mode. Because multi-point sampling samples the image at multiple points within a display pixel defined by the pixel grid, sub-pixel sized objects can be sampled and the color of the pixel represented on the display. One component of multi-point sampling is the determination of how many subsamples in each pixel are covered by the primitive. The subsample information is determined during scan conversion and forwarded in the form of a mask to the memory controller which modulates the pixel color in accordance with the mask.

As discussed above, conventional methods of determining the mask have used complex hardware to evaluate the coverage of the primitive over each pixel to thereby determine the number of subsamples indicated by the mask. In contrast, in one embodiment of the present invention, well known and existing incremental scan conversion methods are extended by performing complex edge parameter calculations up front in software and using these edge parameters with modified conventional hardware to provide mask information. According to one embodiment of the present invention, mask information is produced by subdividing each scan line into a plurality of sub-scan lines, where sample points are located on sub-scan line boundaries, and then using hardware already provided in the system together with collection hardware of the invention to gather information about coverage of the subsamples within the pixel.

Referring back to FIG. 5, the scan converter 50 according to one embodiment of the present invention is shown including an edge stepper 52, collection logic 54 and a span stepper 56. The operation of each of these components is described below with reference to the portion of the illustrative image 70 shown in FIG. 6. Edge steppers and span steppers are commonly provided in graphics hardware for determining coordinates of pixels that are covered by primitives. With only minor modifications to an existing edge stepper and span stepper unit, the edge stepper 52, collection unit 54 and span steppers of one embodiment of the present invention can also provide mask information for use by the memory controller 60 during anti-aliasing operations.

The edge stepper 52 receives the edge equations, such as those shown in FIG. 4A, from the graphics accelerator 18. Using the edge equations, the edge stepper incrementally steps along the edges of the primitive using a previously calculated edge point and pre-computed edge slope data to determine the edge coordinates of the primitive. In accordance with one embodiment of the invention, the edge stepper can operate in either an aliased mode or an anti-aliased mode. In both modes, the basic method of operation is identical, it is only the input parameters to the edge stepper that differ. For purposes of explanation, an introduction to the edge stepping process will first be described with the edge stepper operating in conventional aliased mode. Then the modifications to the input parameters used when operating in anti-aliased mode will be described.

Figure 7:
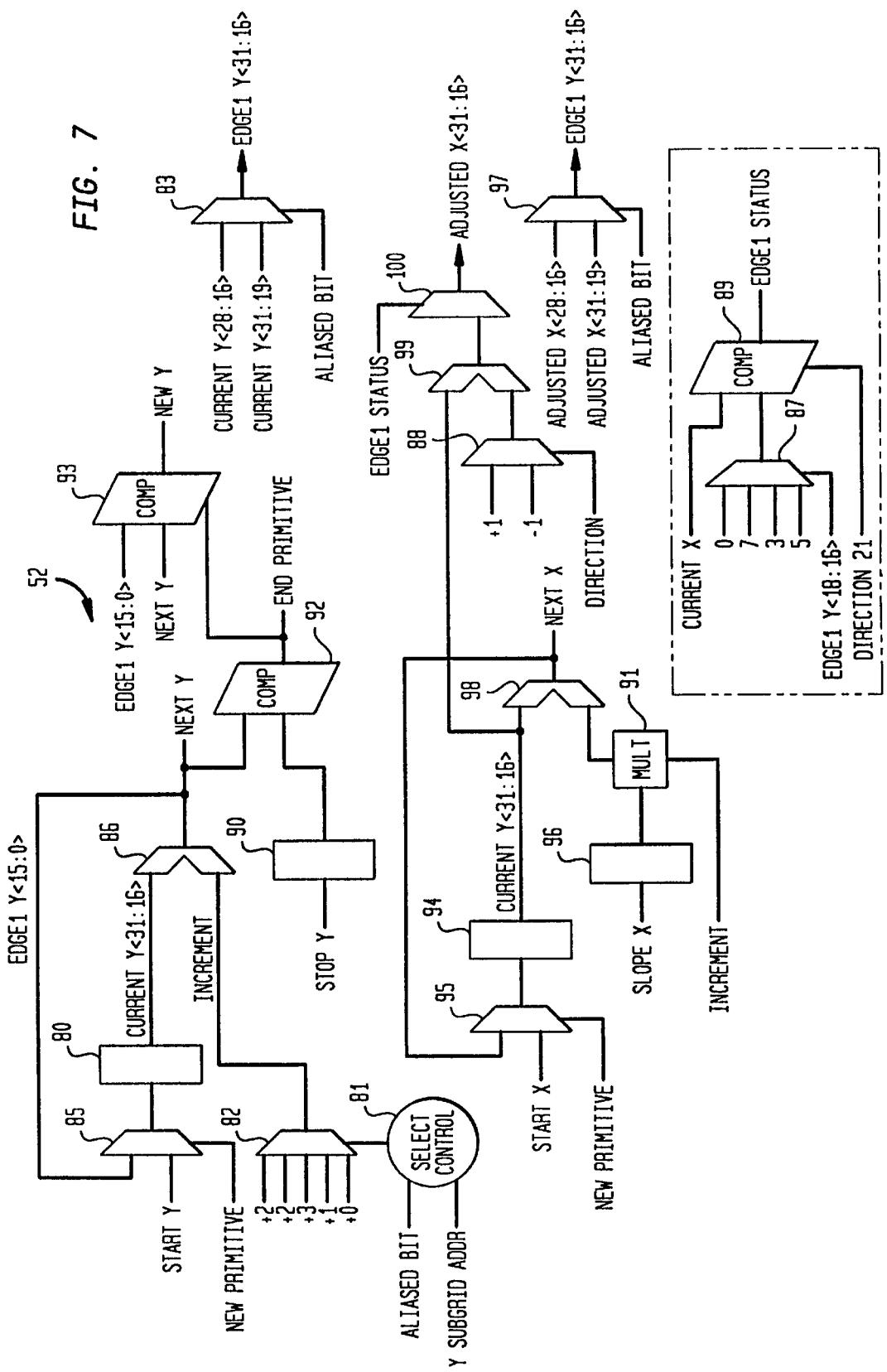
FIG. 7 is a block diagram of one embodiment of an edge stepper unit of the frame buffer controller of FIG. 5 in accordance with the present invention.

For example, the edges of the primitive 74 of FIG. 6 are indicated as edge one, edge two, and edge three. As described above, the edge stepper receives edge start and end information and slope information for the primitive. The edge stepper steps along each of the edges, gathering coordinate data for each of the pixels on each of the edges. When stepping along edge one, the edge stepper 'steps' from the start of edge one (where edge one crosses the scan line with the lowest y coordinate; i.e. point A in FIG. 6) to the next pixel coordinate of edge one until reaching the end of edge one, i.e., to vertex v1, essentially drawing a line between the two and determining what pixels in the image 70 are touched by edge one. A block diagram of one illustrative embodiment of an edge stepper for implementing both aliased and anti-aliased modes of the present invention is shown in FIG. 7. To step along edge one, the edge stepper logic uses a start y component and a stop y component received as part of the edge equation data from graphics accelerator 18. The start y component is the y address where edge one first crosses a scan line. The stop y component is the y component of vertex v1. In the triangle primitive example of FIG. 6, the start y value (i.e., the y component of point A in FIG. 6) is 1 and stop y value is 3.5. The start y component is fed through multiplexer 85 and stored in register 80 as Edge1 Y<15:0>. The Edge1 Y component is the Y component that is forwarded out of the edge stepper 52 to the collection logic 54. The Edge1 Y component is forwarded to adder 86, where an increment value is added to the Edge1 Y component to provide the Next Y component. The increment value is provided by multiplexer 82, which selects one of a variety of values based on the status of an aliased bit, indicating whether the edge stepper is operating in aliased or anti-aliased mode, and a subgrid address which is described in more detail below. Whenever the graphics device is operating in aliased mode, a +1 is added to the start y component to increment to the next scan line since each pixel y component is aligned on a scan line boundary. The remaining possible increment values, input to multiplexer 82, are provided for supporting operations in anti-aliasing mode, as explained in more detail below. Thus, the modifications to the edge stepper logic for supporting anti-aliased mode include multiplexer 82 and select control 84 and comparator 93 that will be explained later.

In addition to the start y and stop y components, a start x component is fed through multiplexer 95 and stored in a register 94. A slope x component is stored in a register 96. The start x and slope x components are received as part of the edge equation data from graphics accelerator 18. The start x component is the x component of edge one where edge one first crosses a scan line; i.e., the x coordinate corresponding to the start y coordinate (i.e., the x component of point A in FIG. 6). The slope x is the slope of edge one. In the example of FIG. 6, the start x value is the x address 2.2, and the slope x is 1.5.

During the first cycle of the edge stepping process in aliased mode, the start y component is forwarded through the multiplexer 85 and stored in register 80 as a current y value when a signal New Primitive is asserted. The New Primitive signal is asserted whenever a new primitive is forwarded to the edge stepper unit. The start x component is forwarded through multiplexer 95 when the New Primitive signal is asserted and stored in register 94, providing a current x value. The current x value is forwarded to an adder 99, which adds either a +1 or a −1 to the current x value, for reasons that will be described below. The current x value is also forwarded to a multiplexer 100. The multiplexer 100 selects between the current x value and the incremented (or decremented) x value depending upon the state of an Edge1 Status bit (described in more detail below), to provide an adjusted X<31:16> value. The adjusted X value is forwarded to multiplexer 97, where either a shifted adjusted X value or a non-shifted adjusted X value, depending upon the status of an Aliased Bit (indicating operation in anti-aliased mode) as Edge1 X<31:16>. The Edge1 X<31:16> value is forwarded out of the edge stepper 52 to the collection logic 54. Similarly, the current Y<31:16> is forwarded to multiplexer 83, which selects either a shifted current Y value or a non-shifted current Y value as an Edge1 Y<31:16> value depending upon the state of the Aliased Bit. Thus, in this example, the first Edge1 X, Edge1 Y component pair that is forwarded out of the edge stepper is (1,2).

The current Y component is incremented by +1, and the result is fed back through multiplexer 85 and stored in register 88. In the same cycle, the slope x is multiplied at multiplier 91 by the increment value provided from multiplexer 82 (which, for aliased mode, is +1), added to the current X component at adder 98, and output as a Next X component The Next X component is forwarded through multiplexer 95, and loaded in register 94. As a result, a second coordinate pair of (2, 3) is generated for edge one. The current Y component is incremented by +1, the current X is incremented by the slope, and the results are loaded in registers 80 and 94, respectively, to provide Edge1 X, Edge1 Y coordinates of (3,5) for the next cycle. The process of incrementing continues until a comparator 92 determines that the Next Y value is greater than the value stored in the stop y register 90. When the Next Y value is greater than the stop y value, edge stepping of the primitive is completed, and the signal End Primitive is asserted. Thus, the signals forwarded out of edge stepper 52 to collection logic 54 are the Edge1 X, Edge1 Y and End Primitive signals.

In one embodiment, edges two and three are treated as one edge (edge two/three) joined by a bend. The edge stepping logic for edge two/three is similar to that provided for edge one, with one exception. During the stepping of edge two/three, stepping is first done along edge two until the stop y value for edge two is encountered, and then stepping continues along edge three. Thus, referring to the example in FIG. 6, edge stepping would occur along edge two, starting from edge two start x and start y coordinates (0.8,1) (indicated by point B in FIG. 6), and producing an edge two coordinate of (0.6,2). When the y coordinate is incremented to the third scanline, a compare, similar to the compare done by comparator 92 in FIG. 7, is performed to compare the Next Y value against the stop Y value stored in a register similar to register 90. When the edge two Y coordinate is greater than the edge two stop Y value, stepping begins along edge three at an edge three start X coordinate. In the example of FIG. 6, the first edge three coordinate that is generated is for scan line three, and is (2.7,3) (indicated by point C in FIG. 6). Stepping along edge three continues until the End Primitive signal is asserted by the Edge One edge stepper. Thus, the logic in FIG. 7 is modified in the edge two/three stepper by adding a multiplexer before the start x register 94 (to select between an edge two start x and an edge three start x) and adding a multiplexer before the stop Y register 90 (to select between an edge two stop Y and an edge one stop Y that is equal to the edge three stop y). In addition, a multiplexer is added before register 96, to select between and edge two slope and an edge three slope, and a multiplexer is added before start x register 95 to select between edge two and edge three start. An edge two/three coordinate may be generated at the same time that an edge one coordinate is generated for each scan line.

After generation of the edge one and edge two/three coordinates for each scan line, in aliased mode the coordinates are forwarded to span stepper 56 (FIG. 5). Span stepper 56 steps along the x axis from an edge one x coordinate to an edge two/three x coordinate on each scan line covered by the primitive to determine the x,y coordinates of all of the pixels between edge one and edge two/three, and consequently all of the pixels covered by the primitive on that scan line.

Figure 1:
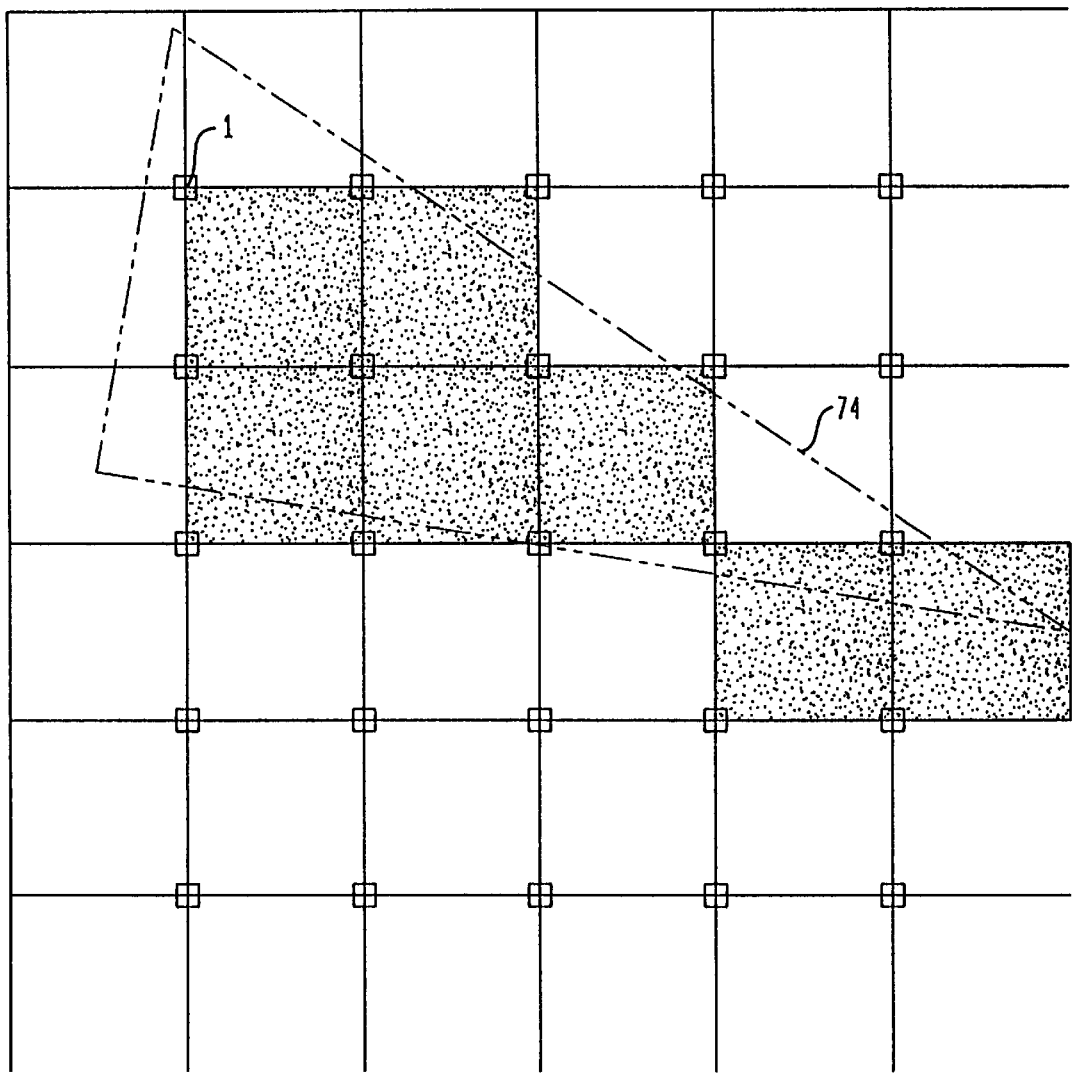
FIG. 1 is an example of an aliased rendering of a primitive.

FIG. 1 is an example rendering of primitive 74 in aliased mode, where pixel coordinates have been generated using the edge stepping and span stepping operations described above. Since only the pixel coordinates are compared and generated during span stepping and edge stepping, only those pixels having their complete location covered by the primitive are 'on', the remaining pixels are 'off'. In addition, because in aliased mode there is no modulation of color along the edges of the primitive, each pixel is either the background color or the primitive color. Thus, the aliased mode of operation is useful for rending primitives when high performance is desired. However, as shown in FIG. 1, aliased edges are often jagged and visually displeasing.

Anti-aliasing using multi point sampling methods generally produces higher quality images, but at a reduced performance or higher hardware cost as compared to aliased images since multiple samples of each pixel are analyzed when determining the color of each pixel. As described above, the edge stepping and scan stepping are performed in aliased mode on a scan line granularity for providing pixel coordinate information to the memory controller. In one embodiment of the invention, in anti-aliased mode, however, each pixel is apportioned into a number of sub-scan lines, and edge stepping is performed on a sub-scan line granularity. Subsamples are located on one or more sub-scan lines, and information about whether each of the subsamples is covered by the primitive is forwarded during anti-aliased mode to the memory controller by the span stepper. In one embodiment of the invention, the same hardware is advantageously used for edge stepping and span stepping in both aliased and anti-aliased modes of operation. Thus, sub-sample information may be provided with minimal changes to the edge stepper and span stepper hardware.

In one embodiment of the invention, before each scan line is subdivided into a plurality of sub-scan lines, the image is first scaled by a predetermined amount such that each of the sub-scan lines falls on an integer address boundaries. In this manner, the span and edge steppers need not deal with fractional pixel addresses, which simplifies the hardware. However, although this feature is advantageous, the invention is not limited in this regard. Thus, scaling need not be used, and sub-scan line coordinates can correspond to fractions of pixel coordinates. Thus, scaling is merely one embodiment for dividing a scan line into a number of sub-scan lines associated with sample coordinates within a pixel.

In the scaling embodiment of the invention, the scaling of the image is performed in the transform unit 30 (FIG. 3) of the graphics accelerator chip 18 by multiplying the values in the transform matrix 32 (FIG. 3) by a desired scaling value. No additional functionality need be added to the transform unit to provide this anti-aliasing support, as it already includes the scaling functionality for providing zoomed images. The scaling value is determined in part by the number of sample points that are desired for each pixel. In one embodiment of the invention, a scaling value of eight is used for accommodating placement of four sample points, although other scaling values and numbers of sample points may alternatively be used. The selection of the number of scaling points is influenced by the compute time required to process each of the samples on the sub-scan lines, and a relative improvement of the anti-aliased image over an aliased representation of the image. In one embodiment of the invention, using four sample points per pixel has been found to provide significantly improved image quality over the aliased image while maintaining good performance.

As discussed above, in one embodiment of the invention, the scaling factor (e.g., eight) is greater than the number of sample points (e.g., four). This is advantageous in that it facilitates a non-regular placement of the sub-samples within the pixel. A non-regular placement means that the subsamples of each pixel may be placed at locations along the sub-scan lines such that the subsamples do not form a regular, grid-like pattern. Placing the subsamples at non-regular intervals along the sub-scan lines results in a reduction of the visual artifacts that are caused by ordered structures. However, the present invention is not limited, when scaling, to using a scaling factor that is greater than the number of samples. One technique that may be used for determining a scaling value and the number of sample points for producing an output image with minimal visual artifacts is described in "Hardware Assisted Polygon Anti-Aliasing", IEEE Computer Graphics & Applications, January, 1991, by Anthony C. Barkans, incorporated herein by reference.

The scaling of an image by eight provides a number of other advantages. Because the scaling amount is a power of two, the multiplication step of scaling is easily accomplished by bit shifting. In addition, because a scaling size of eight was selected, three bits are used for determining a sub-scan line address. As will be described below, the x and y addresses used in one embodiment of the present invention each include a sixteen-bit integer portion such that the span and edge stepper hardware include registers capable of supporting sixteen bits of integer pixel coordinates. When three of the integer address bits are used as sub-scan line address bits during anti-aliasing, thirteen y address bits remain for addressing pixels within an image. Many applications, such as X Windows, require an image pixel address range of 8K, requiring thirteen bits. The use of a scaling factor of eight allows for maximizing the flexibility of subsample placement while still supporting applications such as X Windows for anti-aliasing operations.

Although one embodiment of the present invention uses a scaling factor of eight with four subsamples, the present invention is not limited to these values. Rather, other scaling factors and other numbers of subsamples may alternatively be used. As described above, the selection of the scale value is dependent upon the available address space and the ease of computation. The selection of the numbers of subsamples is determined based upon a desired image quality and a desired performance.

Figure 8:
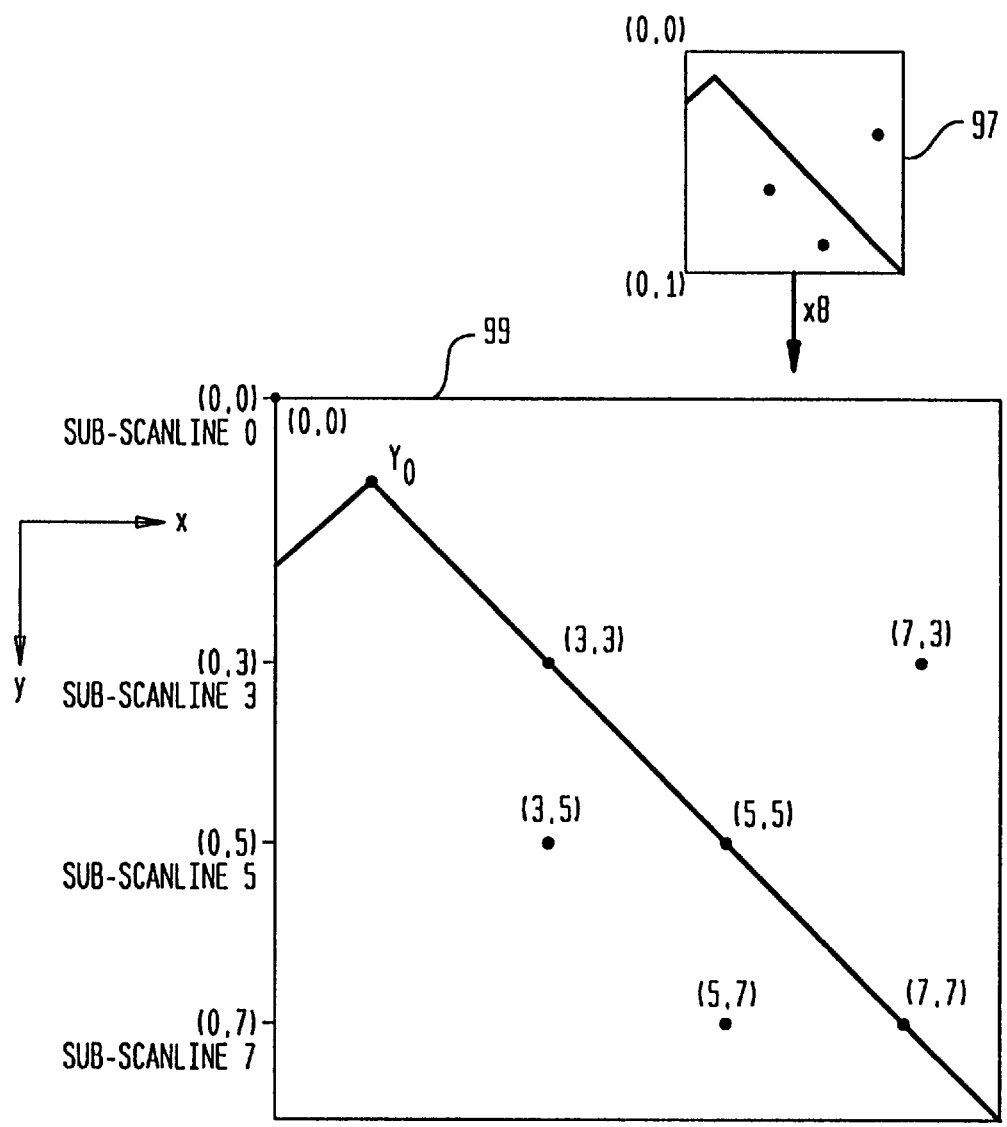
FIG. 8 is an illustrative example of the scaling of pixels used in one embodiment of the present invention for determining sample points during multi-point sampling.

Referring now to FIG. 8, an example pixel 97 is shown. Before scaling, the scan line boundaries of the pixel are defined by scan line 0 and scan line 1. The pixel 97 is scaled by a factor of eight to produce scaled pixel 99. In the scaled pixel 99, subsample pixels are located at sub-scan line 0, sub-scan line 3, sub-scan line 5 and sub-scan line 7. In the example of FIG. 8, the subsamples are located at the following positions: subsample 0=(0, 0), subsample 1=(7, 3), subsample 2=(3, 5), and subsample 3=(5, 7). The subsamples may alternatively be placed at other points along the sub-scan lines.

Although multi-point sampling will now be described with regards to an edge stepping technique, the above scaling technique may also be used to simplify mathematical calculations in other methods of antialiasing operations, where the mathematical calculations operate on at least one piece of information relating to the image and where the information includes a fractional components. Examples of the information may include sub-sample points, in multi-point sampling, but may also slope and edge equation parameters. Therefore, scaling of the image may be used to eliminate the fractional components of information, to thereby eliminate the need for complex floating point calculations.

Edge stepping is performed on the scaled grid for anti-aliased images in a manner similar to that described with reference to FIG. 7 for aliased images. The only difference lies in how the Y axis address is interpreted; i.e., the Y axis address is a sub-scan line address in anti-aliased mode, as opposed to a scan line address in aliased mode.

Figure 9:
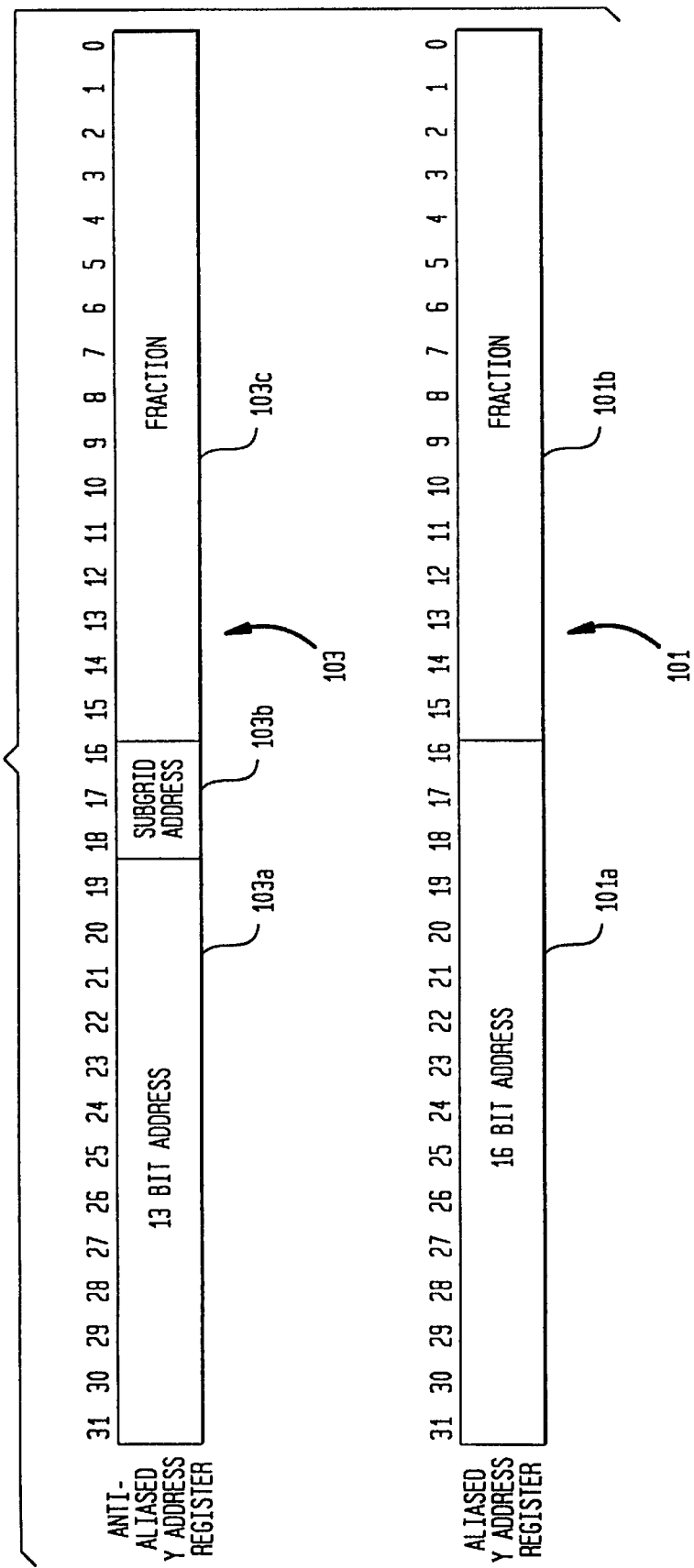
FIG. 9 is an illustrative assignment of x and y coordinate address bits during aliased and anti-aliased operation in accordance with the present invention.

Referring now to FIG. 9, one embodiment of the X or Y address register is shown comprising thirty-two bits stored in a sixteen.sixteen format. In a sixteen.sixteen format, the most significant sixteen bits are integers, and the least significant sixteen bits represent a fractional portion of the address. One illustrative assignment of X or Y address register bits when operating in aliased mode is shown as register 101, where the integer portion of the X or Y address register 101a comprises sixteen bits of X or Y address information. An illustrative assignment of X or Y address register bits when operating in anti-aliased mode is shown as register 103, where the integer portion of the X or Y address includes a thirteen bit X or Y address 103a, and a three bit subgrid address 103b, where the three bit subgrid address encodes an address of one of the eight sub-scan lines of the pixel. Edge stepping in aliased mode uses the integer portion of the Y address register bits (31:16 shown in FIG. 9) as a basis for incremental stepping, while edge stepping in anti-aliased mode uses the same Y bits <31:16> but, as will be shown, sub-grid address bits <18:16> are used to control part of the anti-aliasing process.

Although there are eight possible subgrid Y values, in the illustrative embodiment only four subsamples are used. As a result, only the four sub-scan lines on which the sub-samples lie (as shown in FIG. 8) are analyzed during the edge stepping process. Therefore, if the initial Y address subgrid field 103b is not a subgrid value that corresponds to a sub-scan line, the starting Y address is incremented to start at the next sub-scan line within the grid. For example, if the Y subgrid address field 103 was a 1, the start Y value for stepping is incremented by +2 to a 3, since that is the next sub-scan line having a sample point in the grid.

Referring back to FIG. 7, a description of how, in one embodiment of the invention, the edge stepping hardware is also used for anti-aliased edge stepping is described. The start y value is forwarded through multiplexer 85, loaded into register 80 and stored as current Y<31:16>. The current Y <31:16> if forwarded to multiplexer 93, where either a shifted Y of a non-shifted current Y is provided as the Edge1 Y value depending upon the status of the Aliased Bit. As described in FIG. 9, bits <18:16> are used in anti-aliased mode to provide a sub-scan line granularity for stepping. Thus, for anti-aliased mode, the integer portion of the Y component is formed from bits <31:16> of the current Y value, and for aliased mode the integer portion of the Y component is formed from bits <28:16> of the current Y value.

The current Y value is also forwarded to the adder 86. In addition, an increment is also forwarded to the adder 86. The amount of the increment is determined by select control logic 81, and is based on the status of the Aliased Bit (which, as described above, indicates whether or not the graphics device is operating in aliased mode) and is further based on the initial subgrid address. As described above, if the subgrid address is not a sub-scan line address having a sample point, then the initial add operation adds the desired increment to go to the next sub-scan line. The increment needed for reaching the next sub-scan line address is then selected based upon the current sub-scan line address, and a delta y to the next sub-scan line address. For example, if the y component of the sub-scan line addresses are (0), (3), (5) and (7), then the sub-scan line delta from sub-scan line zero to sub-scan line one, is +3, from sub-scan line one to sub-scan line two is +2, from sub-scan line two to sub-scan line three is +2, and from sub-scan line three to sub-scan line 0 of the next pixel is a +1.

Using the example of FIG. 8, and stepping along edge one, the start y value is a 1, the stop y value is greater than 8.0 (since the edge extends beyond the pixel 99), the start x value is a one, and the slope x is a one. During the first cycle, the start y component is forwarded through multiplexer 85, stored in registers 80, and output as Edge1 Y to the collection logic 54. The start x component is forwarded through multiplexer 95 and stored in register 94 to provide a current x value. The current x value is forwarded through multiplexer 100 and provided as an adjusted X value, which is shifted in a manner similar to that described above with regard to the current Y component to provide an Edge1 X component for forwarding to collection logic 54.

During the next cycle of the edge stepping process, the current Y component of 1 is incremented by +2 to get to sub-scan line 3. The x coordinate at sub-scan line 3 is determined by multiplying the slope x value at multiplier 91 by the increment value of +2 and adding the results to the current X value at adder 98. The results from the adder 98 are fed back through multiplexer 95 and stored in register 94 to ultimately provide Edge1 Y and Edge1 X coordinates of (3, 3) for the next processing cycle of (3, 3). During the next cycle, the increment amount needed to get to the next sub-scan line (y=5) is a +2. The process proceeds as described above, yielding edge coordinates of (5, 5) and (7, 7) in the next two cycles.

A comparator 93 compares the upper thirteen bits of the Next Y component from the adder 86 against the upper thirteen bits of the Edge1 Y value from register 80. As mentioned above, the upper thirteen bits represent the scan line component of the Y address. The two are unequal each time a scan line boundary has been crossed. When the two are unequal, or when the End Primitive signal is asserted, a New Y signal is asserted to indicate the start of processing of a new scan line. The New Y signal is forwarded to the collection logic 54.

During the analysis of pixel 99, four sets of Edge1 X, Edge1 Y coordinate pairs are generated, although only three of the coordinate pairs fall on sub-scan lines. It can be seen, though, that a total of four edge sub-scan line coordinates are generated for each pixel for cases where the edge extends over all of the sub-scan lines of the pixel. As each edge sub-scan line coordinate x,y pair is generated, it is fed to collection logic 54 (FIG. 5). In addition, along with each edge sub-scan line coordinate x,y pair is sent the y subgrid address of the sub-scan line. As will be described in more detail below, the y subgrid address is used to distinguish between the x,y coordinate pairs that are on a valid sub-scanline (i.e., sub-scan lines zero, three, five or seven), and those that are not (i.e., those that fall on sub-scan lines one, two, four or six).

The edge stepper 52 additionally includes status logic 84 for providing a status bit indicating whether a sub-sample on a sub-scan line is covered by an edge of the primitive. The status bit is determined according to the x coordinate of the edge as it crosses the sub-scan line, the x coordinate of the subsample on the respective sub-scan line, and the direction value received from the graphics accelerator 18.

As described above, the direction value indicates what direction is stepped to go from edge one (the edge of the primitive with the largest Y axis span) to edge two (the edge that shares the uppermost Y vertex with edge one). For example, a '1' value for the direction may indicate that edge one is on the left and that stepping is done from left to right, and a '0' may indicate that edge one is on the right, and that stepping is done from right to left. The direction value may be provided as a signal to the scan converter logic 50 on bus 19, or alternatively may be written to a register (not shown) of the scan conversion logic 50. In one embodiment of the invention, the direction signal is encoded in the CMD field forwarded from graphics accelerator 18 to the scan conversion logic 50.

As the edge stepper steps along the sub-scan lines, gathering x,y sub-scan line coordinate data, a status bit indicating whether the subsample on the sub-scan line is covered is generated by status logic 84 (FIG. 7). Status logic 84 includes a comparator 89 coupled to receive the current x coordinate from register 94. The comparator also receives input from a multiplexer 87. The data inputs to the multiplexer are the x coordinates of the subsamples for each sub-scan line. As described above, the subsample coordinates in the illustrative embodiment are (0, 0), (7, 3), (3, 5) and (5, 7). The select inputs of the multiplexer 87 are controlled by the subgrid address bits <18:16> of FIG. 9, which correspond to the sub-scan line address bits.

The compare logic 89 also receives, as an input, the direction signal. If the direction signal indicates that the step direction is left to right, the compare logic asserts the status line for all sub-scan lines where the x coordinate of the edge is less than the subsample x coordinate (since all valid subsamples will be to the right of the edge). If the direction signal indicates that the step direction is right to left, the compare logic asserts the status line for all sub-scan lines where the x coordinate of the edge is greater than the subsample x coordinate, since all valid subsamples will be to the left of the edge. The edge stepping logic for edge two/three is substantially similar to that shown in FIG. 6 for edge one. One difference, however, is that an inverted value of the direction signal is input to the status logic 84 to ensure that the appropriate subsample pixels are selected for edge two/three.

The Edge1 status signal is used to control multiplexer 100. If the current x coordinate does not cover a subsample, then the Edge1 status signal causes multiplexer 100 to select a modified current x value as the Edge1 X component that is forwarded to the collection logic. The modified x coordinate is the next sequential integer x coordinate in the direction of stepping relative to the current x coordinate. Thus, the current x coordinate is either incremented or decremented by 1 by the adder 99, depending upon the direction of stepping, if the compare operation performed by the status logic 84 indicates that the current x coordinate does not cover a sample point on the sub-scan line. The incrementing or decrementing of the x coordinate is provided to help identify specific types of primitives having a width that is less than the width of a pixel. Suffice it to say that, after adjustment of the current x coordinates for both edge one and edge two, it may occur that the distance between edge one and edge two/three is less than or equal to zero. The effect of having a distance less than or equal to zero between edges will be described later herein.

Thus, the Edge1 X, Edge1 Y, Edge23 X, New Y, and End Primitive signals are all forwarded to the collection logic 54 from the edge stepper 52. The Edge1 X, Edge23 X and Edge1 Y coordinates are forwarded after each sub-scan line calculation. The New Y signal is asserted when all the sub-scan lines in a given scan line have been processed. The End Primitive signal is asserted when the stepping of the primitive is complete.

Figure 10:
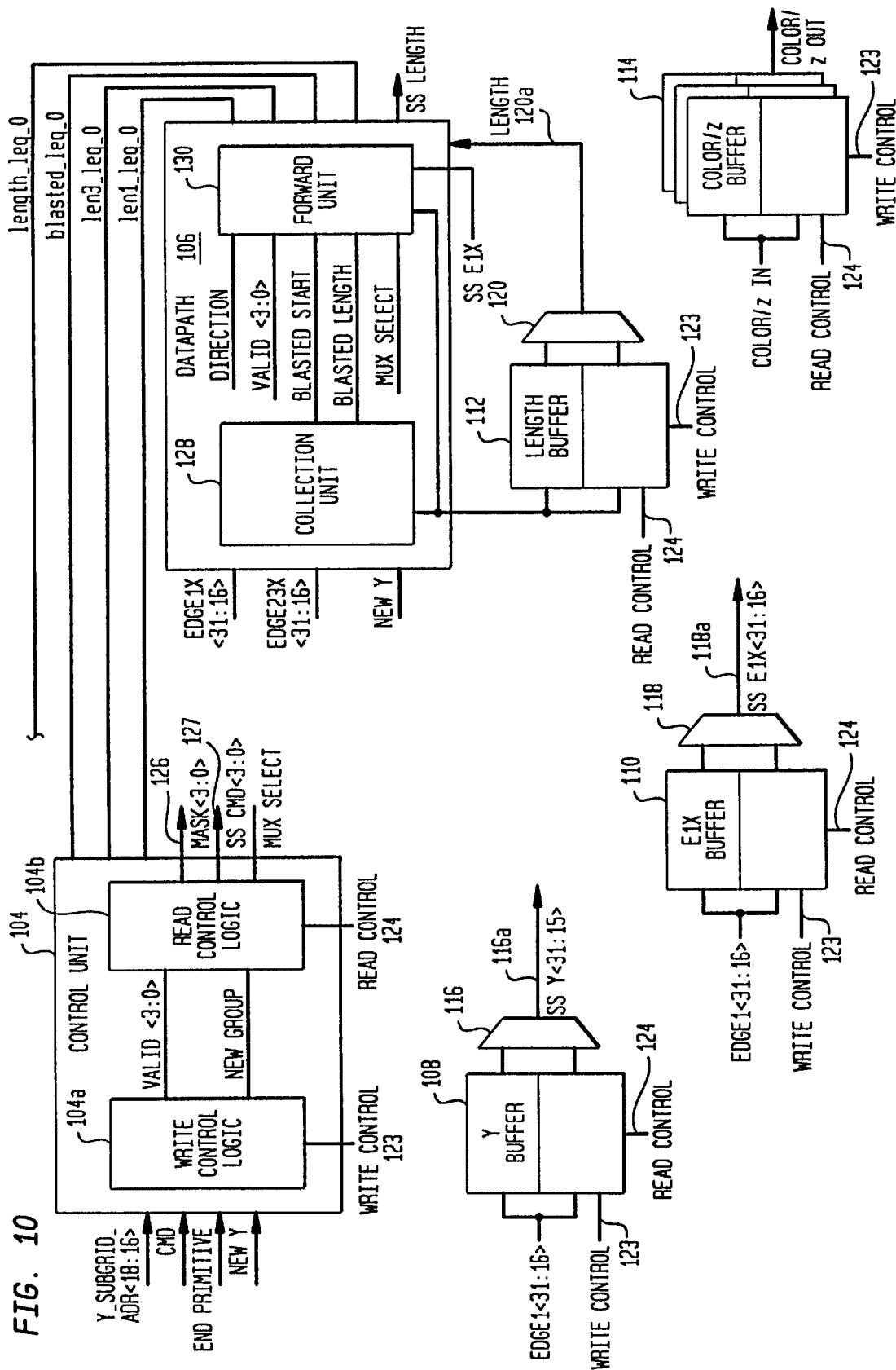
FIG. 10 is a block diagram of one embodiment of a collection unit, used for collecting multi-point samples in accordance with the present invention.

Referring now to FIG. 10, a block diagram of one illustrative embodiment of the collection logic is shown including a control unit 104, a datapath 106, a Y coordinate buffer 108, an Edge1 X coordinate buffer 110, a length buffer 112, and plurality of other buffers 114, which store color, z and other data corresponding to each of the edges. Each of the buffers 108, 110, 112, and 114 includes two sets of four registers, where each four-register set stores a collection of sub-scan line edge coordinate data for the pixel most recently processed by the edge stepper. Data is received alternately by each half of the buffer, such that data may be input to one half of the buffer while data is being read out of the other half of the buffer.

The control logic 104 receives the sub-scan line Y coordinate, New Y signal, End Primitive signal and a CMD field for identifying a function to be performed on the pixel data. For example, the CMD field may be decoded to provide a mode status bit indicating operation in anti-aliased mode and a direction value indicating the direction of stepping. The control unit includes two functional units, a write control unit 104*a* and a read control unit 104*b*. The write control logic controls the writing of the received Edge1 Y and Edge1 X coordinate data into buffers 108 and 110, respectively. In addition, as will be described in more detail below, the write control logic controls the writing of a length value, corresponding to the Edge1 Y and Edge1 X values, into a length buffer 112.

The Edge1 X and Edge23 X components are forwarded to the datapath 106. The datapath processes the Edge1 X and Edge23 X coordinates to provide a collected length value. The write control logic controls the subsequent writing of the collected length value from datapath 106 to buffer 112. The write control logic 104*a* also provides VALID<3:0> signals and a New Group signal to the read control logic 104*b*. The New Group signal is asserted when either the New Y signal or the End Primitive signal is asserted by edge stepper 52. Each bit of the VALID signal corresponds to one of the four sub-scan lines, and indicates whether or not the sub-scan line was touched by the primitive. In one embodiment of the invention, the VALID signals are encoded from the y subgrid address bits <18:16>.

The read control logic 104*b* includes a state machine that controls the transmission of command, coordinate, length and mask data to the span stepper (SS). In particular, the read control logic controls the transfer of SS CMD<3:0> (from control unit 104), SS Y<31:15> (from buffer 108), SS E1X<15:0> (from buffer 110), SS Length signals (from buffer 112), and Color Z/out signals from buffer 114 to the span stepper 56. Thus, the write control logic 104a controls the accumulation of sub-scan line information in buffers 108, 110, 112 and 114, while the read control logic 104b controls the transfer of data from buffers 108, 110, 112 and 114 to the span stepper logic 58 (FIG. 5). The read control logic 104b additionally provides a MASK<3:0> that is forwarded to the span stepper to identify the sub-samples covered by a pixel. A mux select signal is forwarded from the read control unit 104b to the datapath 106 to control the forwarding of the SS Length signal to the span stepper as described in more detail below.

The datapath 106 similarly includes a collection unit 128 and a forward unit 130. The collection unit 128 receives the Edge1 X and Edge23 X coordinate data from the edge stepper 52. The Edge1 X and Edge23 X coordinates correspond to the edge one and edge two/three coordinates for the Y sub-scan line coordinate being processed. Using this coordinate information, the collection unit 128 is able to determine, for each sub-scan line a length of the sub-scan line. The length of the sub-scan line is provided from the collection unit 128 as signals collected length, and stored in length buffer 112.

Figure 11:
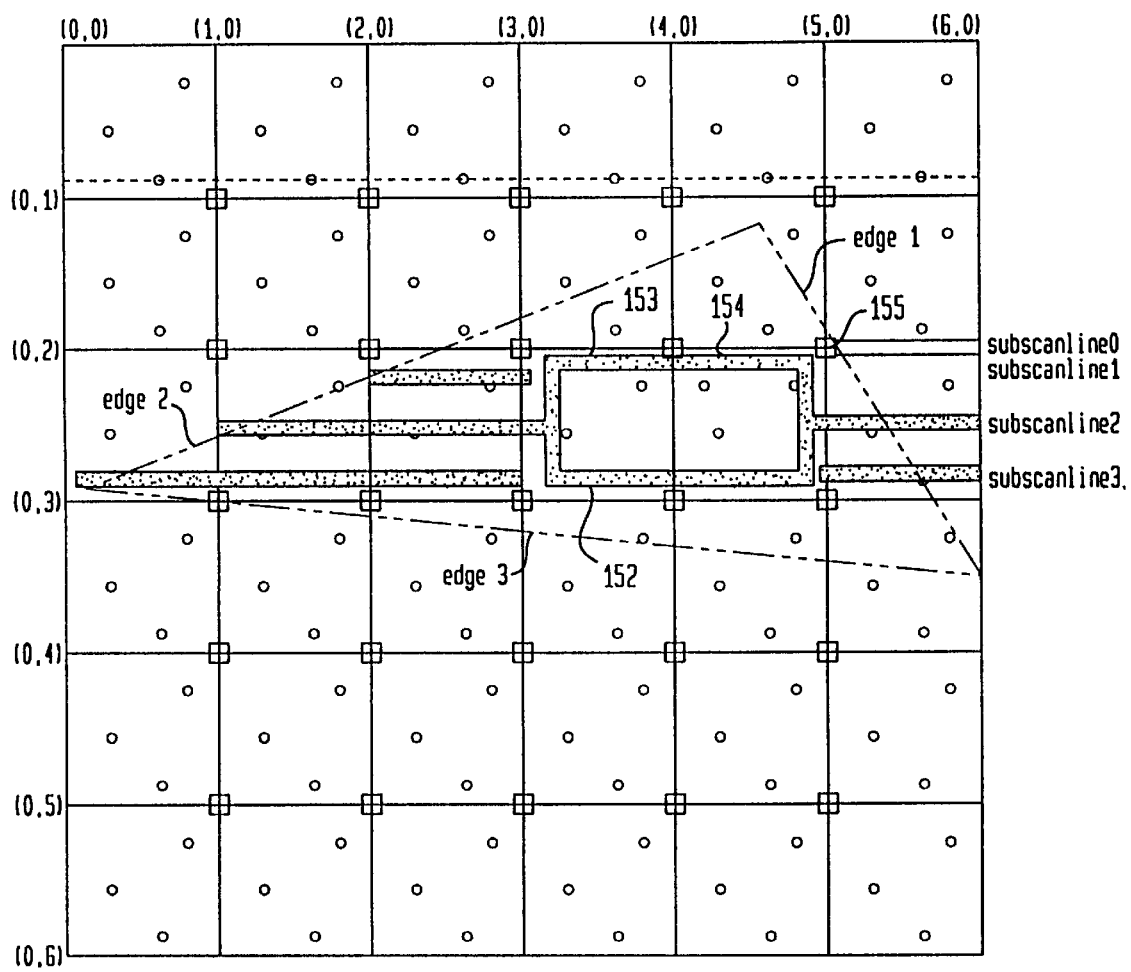
FIG. 11 is an illustration of a primitive drawn on a pixel grid for explaining operation of the collection logic of FIG. 10.

In addition to determining the length of each sub-scan line, the collection logic additionally determines a start and end of a 'blasted region' of the sub-scan line being processed, where the blasted region identifies pixels within the sub-scan line having all of their samples covered by the primitive. Referring now to FIG. 11, a primitive 150 is shown. The pixels having all of their subsamples covered by the primitive 150 include pixels 153 and 154, which are referred to as 'blasted' regions of the primitive.

The blasted start value corresponds to the x,y coordinate of the pixel where the blasted region begins. The blasted length value corresponds to the number of pixels that are stepped along the sub-scanline in the blasted region. During the evaluation of each sub-scan line by the collection unit, the x coordinate where the edge of the primitive crosses the sub-scan line is evaluated to determine if it is the x coordinate furthest in the direction of stepping for the set of four sub-scan lines. Using the primitive 150 of FIG. 11 as an example, and using the four sub-scan lines starting from scan line 2, the edge one pixel x coordinates where the edge crosses the sub-scan lines 0, 1, 2 and 3 are 5, 4 and 5, respectively, where the pixel X coordinate of 4 on sub-scan line one is adjusted by the adjustment logic in FIG. 7.

When generating a blasted start value for edge one, as each valid sub-scan line coordinate is received from the write control logic 104a, it is compared against a previously stored sub-scan line x coordinate for the pixel to determine whether it is further in the direction of stepping than a previous sub-scan line x coordinate. Thus, when determining the blasted start value for pixel (5,2), the pixel x coordinate for sub-scan line 0 is a 5, the pixel x coordinate for sub-scan line 1 is a 4.7, the pixel x coordinate for sub-scan line 2 is a 5.5, and the pixel x coordinate for sub-scan line 3 is a 5.7. Thus, the pixel x coordinate of 4.7 is truncated, and selected as the blasted start value. A similar operation is followed using the coordinates of edge two/three to determine the blasted end value.

It should be appreciated that forwarding the same x,y coordinate to the memory controller four times, with different mask bits set, impacts the performance of the anti-aliasing system. Identifying those pixels that are within the blasted region by providing a mask having all of its bits set reduces the number of transfers between the span stepper and the memory controller, since only one memory transfer is made per pixel.

Figure 12:
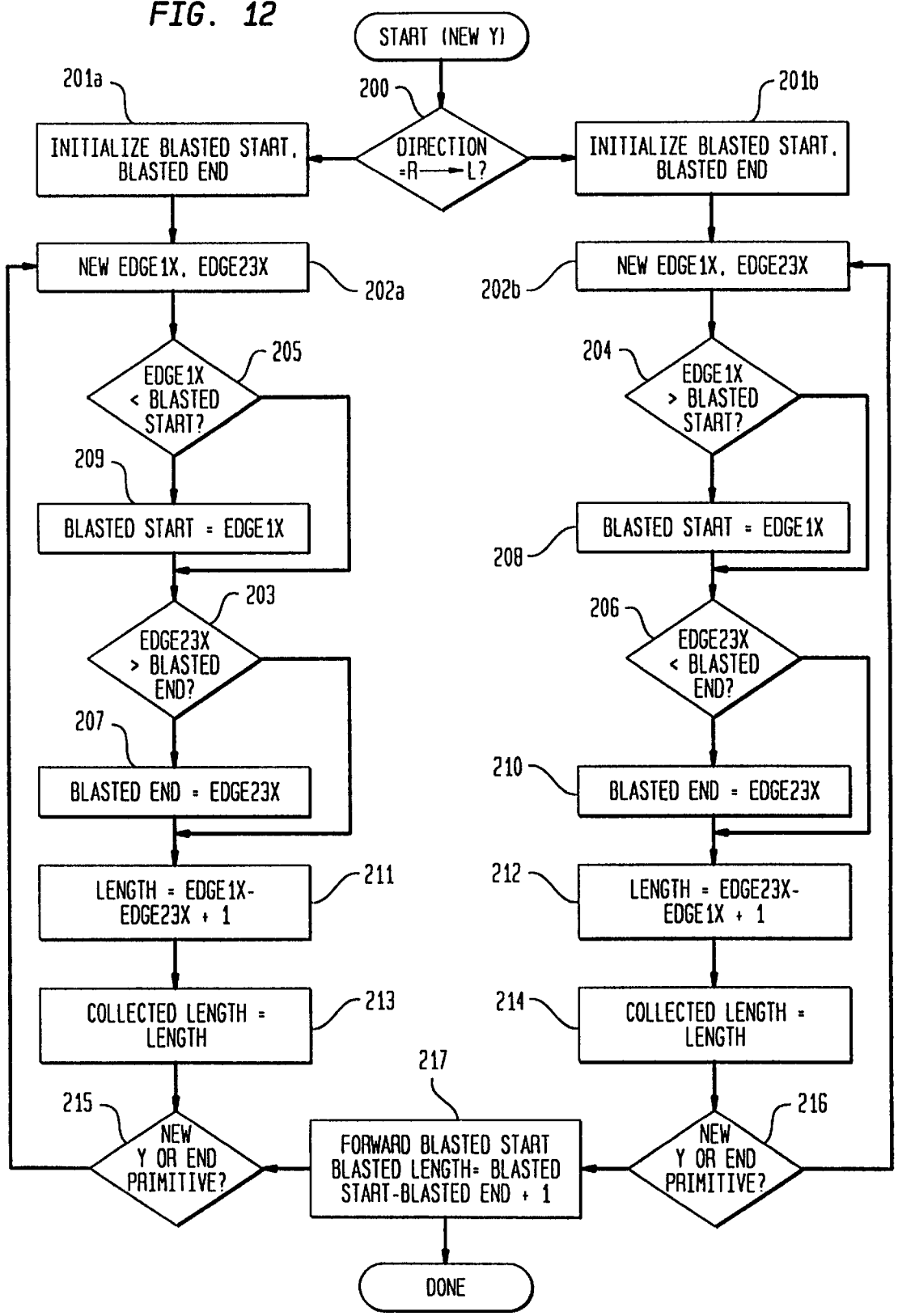
FIG. 12 is a flow diagram illustrating one method of operation of a datapath collection unit of the collection logic of FIG. 10.

Referring now to FIG. 12, a flow diagram is shown illustrating the operation of collection unit 128 for providing the collected length value, the blasted start value and the blasted length value. The collected length value is generated for each sub-scan line. The blasted start and blasted length values are determined after all of the sub-scan lines are evaluated.

For example, at step 200, the direction signal is evaluated. If the stepping direction is from right to left, then the processing path beginning with step 201a is selected. If the stepping direction is from left to right, then the processing path beginning with step 201b is selected. The processing paths are substantially similar, with the differences being in the type of comparisons made (i.e, greater than as opposed to less than) in each path. Thus, only the processing path beginning with step 201a is described below. At step 201a, blasted start and blasted end values are initialized. Depending upon the step direction, the blasted start value is set either to the Edge1 X coordinate, or to the Edge23 X coordinate of the sub-scan line, while the blasted end value is initialized as the opposite of the blasted start. Blasted start values are initialized in this manner to identify subsequent coordinates that are greater than (or less than) the initialized blasted start value (depending on the step direction), as will become more clear with the description below.

At step 202a, the Edge1 X and Edge23 X coordinate for a given sub-scan line are received from write control logic 104a by the collection unit. 128. At step 205, the Edge1 X coordinate is compared against the blasted start value. In the first pass through the steps of FIG. 12, the comparison is made against the blasted start value, while in subsequent passes the comparison is made against the blasted start value as updated during the process. If the Edge1 X coordinate is less than the blasted start value, and the direction of stepping is from right to left, then the Edge1 X value is saved as the blasted start value at step 209. At step 203, a comparison is made to determine whether the Edge23 X coordinate is greater than the blasted end value for a right to left stepping direction, and if it is, then at step 207 the Edge23 X value is stored as the blasted end value. At step 211, the total length of the sub-scan line is determined by subtracting the Edge23 X coordinate from the Edge1 X coordinate. At step 213, the length value, calculated at step 211, is assigned to the collected length that is forwarded from the collection unit 128 and stored in length buffer 112.

The status of the New Y signal, provided from the edge stepper 52 is checked at step 215. The New Y signal is asserted to indicate that the Y input coordinate has advanced to the next full scan line, and thus that all sub-scan lines have been processed for a given scan line, or that the primitive has finished being processed. If at step 215 the New Y signal is not asserted, the process resumes at step 202a, where a new Edge1 X and Edge23 X signal are received from edge stepper 52. If, at step 214, the New Y signal is asserted, a blasted length value is calculated by subtracting the blasted start from the blasted end, and the blasted start and blasted length values are forwarded to forward unit 130 of the datapath 106.

As a group of sub-scan lines are processed according to the process described in FIG. 12, the collected length value for the sub-scan line is accumulated in the buffer 110. When all of the sub-scan lines have been processed, i.e., when the New Y signal is asserted, the read control logic 104b starts the process of forwarding the stored Edge1 X, Edge1 Y, length, Mask, and CMD values for each sub-scan line stored in the buffers, to the span stepper 56. For each sub-scan line Edge1 X and Edge1 Y coordinate pair stored in the buffers 108 and 110, there are potentially three data transfers that may occur for the sub-scan line. In all of the data transfers, the same Edge1 X and Edge1 Y values are forwarded, however, the Mask, CMD, and length values may differ as described below. Although the same Edge1 X coordinate is forwarded to the span stepper for each transfer, it will be seen below that this Edge1 X coordinate is only transferred to the memory controller 60 during the first transfer cycle per sub-scan line.

The three data transfers are used to distinguish between the pixels on the sub-scan line before the blasted region, the pixels within the blasted region, and the pixels beyond the blasted region. The number of pixels before the blasted region is designated as length1, the number of pixels within the blasted region is designated as length2, or blasted length, and the number of pixels beyond the blasted region is designated as length3. The length1 and length3 values may differ for each sub-scan line. For example, referring again to FIG. 11, sub-scan line 0 has a length1 value of one, since there is one pixel, at location (5,2), before the blasted region. Sub-scan line 0 has a length2 value of two, since there are two pixels within the blasted region. The length3 value for sub-scan line 0 is zero, since there are no pixels on sub-scan line zero beyond the blasted region. The length1, length2, and length3 values for sub-scan line 1 are zero, two and one, respectively. The length1, length2 and length3 values for sub-scan line 2 are one, two, and two, respectively, and the respective values for sub-scan line 3 are one, two, and three. The length1, length2 and length3 values are determined by the forward unit 130 (FIG. 10), and used to provide the appropriate length value for each of the three data transfer cycles of the sub-scan line on line SS length to the span stepper 56.

Figure 13:
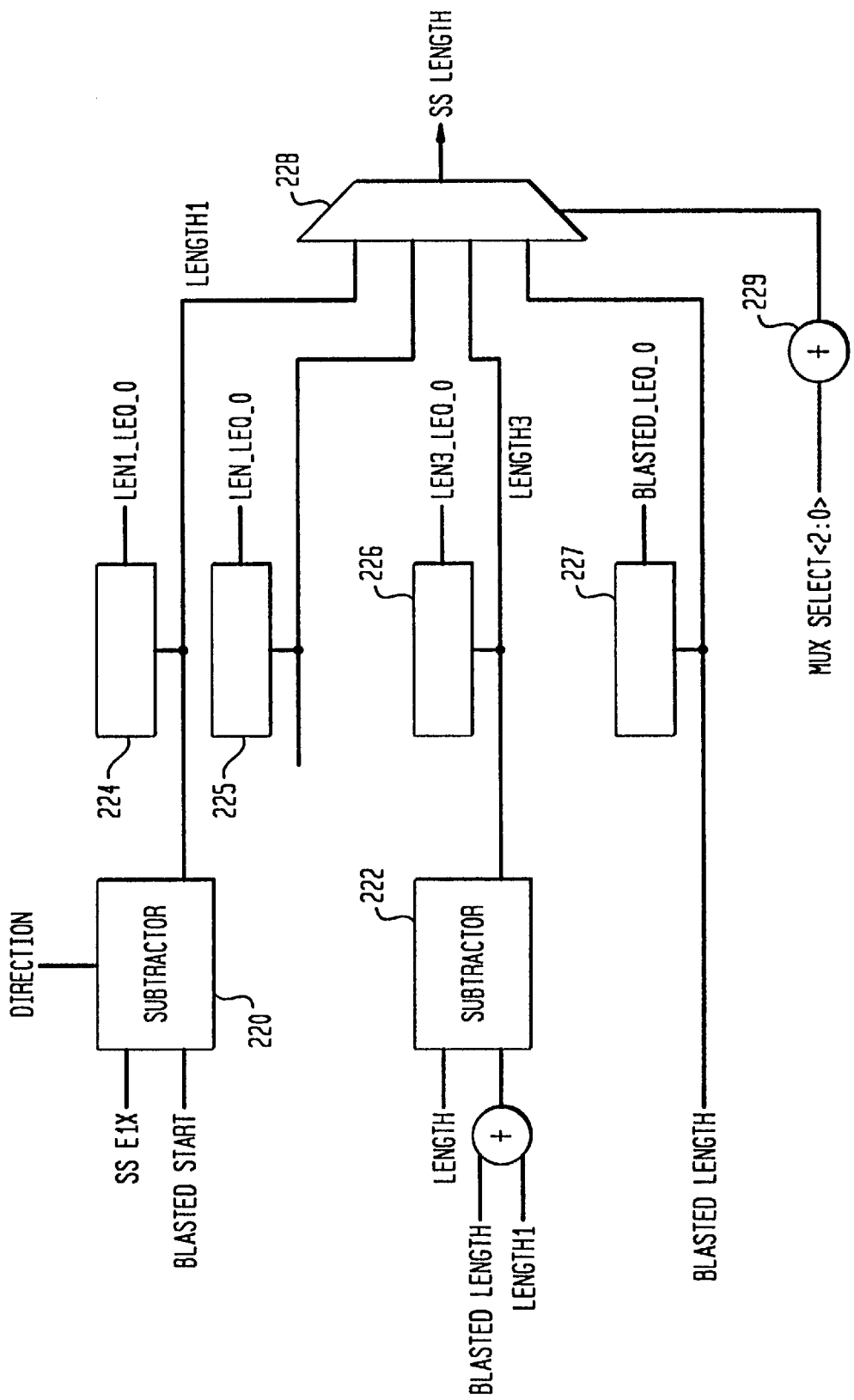
FIG. 13 is a block diagram of one embodiment of a datapath forwarding unit of the collection logic of FIG. 10.

Referring now to FIG. 13, a block diagram of the forward unit 130 is shown including a first subtractor 220 for determining the length1 value in response to the SS E1X value, the blasted start value, and the direction signal. The SS E1X and length values are received from buffers 110 and 112, respectively, for each sub-scan line as controlled by the read control signal from read control logic 104b in the control unit 104. A second subtractor 222 calculates length3 by subtracting the sum of the blasted length and the length1 value from the length value received from buffer 112, which indicates the total length of the sub-scan line as calculated at step 211/212 of FIG. 12. The length1 and length3 values are forwarded to test logic 224 and 226, which test the values to determine if they are less than or equal to zero. If so, the signals len1_leq_0 and len3_leq_0 are respectively asserted, and forwarded to read control logic 104b, which uses them for controlling transfer of pixel data to the span stepper as will be described with regard to FIG. 15. The length value, from buffer 112, is fed to test logic 225 to generate a length_leq_0 signal that is forwarded to read control logic 104b for indicating whether it is less than or equal to zero. The blasted length value is also fed to tester 227 to generate a blasted_leq_0 signal that is forwarded to read control logic 104b, which is also used for controlling the transfer of pixel data to the span stepper as will be described.

The length1, length3, length, and blasted length values are forwarded to a multiplexer 228. Depending upon which portion of the sub-scan line is being forwarded to the span stepper 56 by read control 104b, the appropriate length value is forwarded as SS length to the span stepper by control logic 229 in response to the mux select<2:0> signal received from read control logic 104b.

Figure 14:
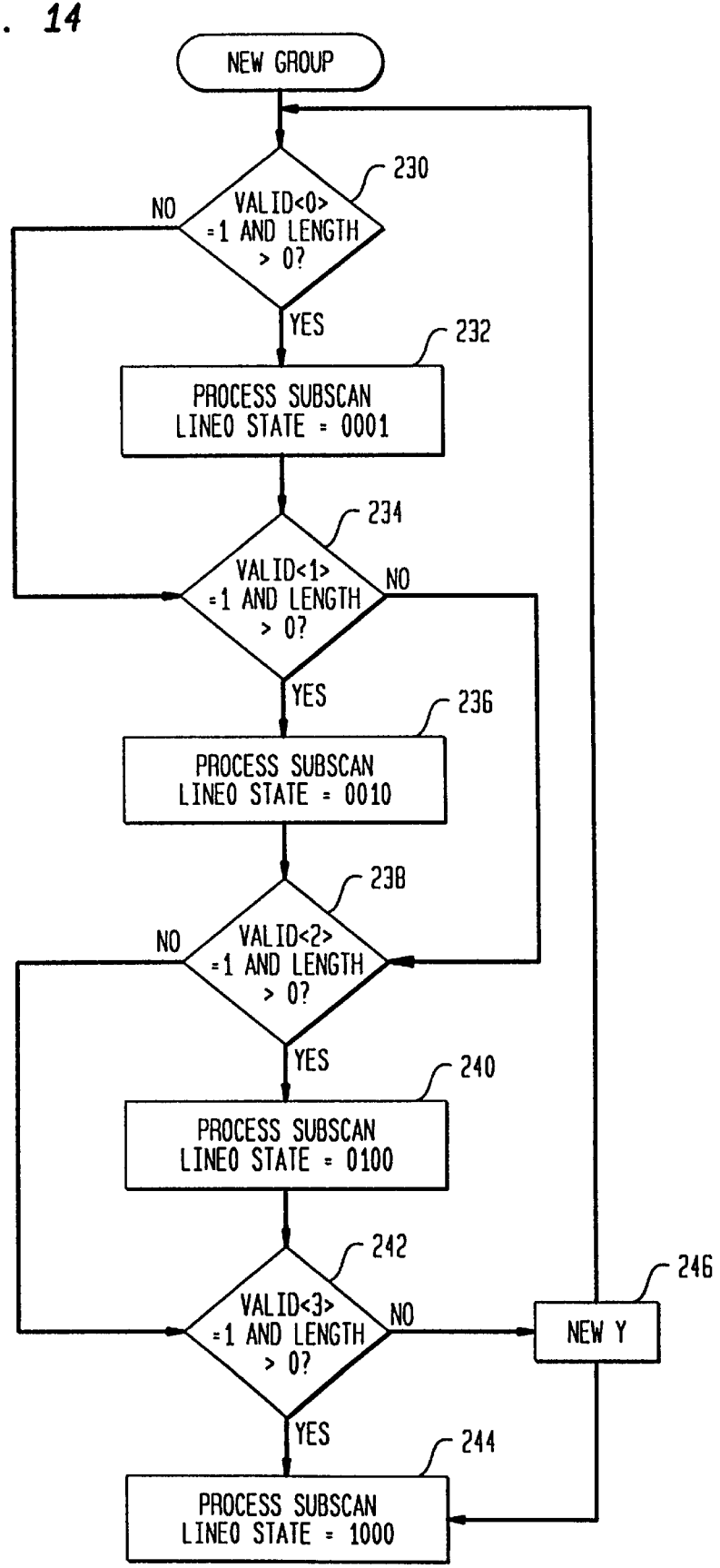
FIG. 14 is a flow diagram illustrating one method of operating read control logic of the collection unit of FIG. 10 to forward sub-scan lines to a span stepper according to the present invention.

Referring now to FIG. 14, a flow diagram illustrating the operation of a state machine operating in anti-aliased mode in read control logic 104b for processing the sub-scan lines is provided. The state machine includes four states, with each state dedicated to processing one of the sub-scan lines. Each state is entered only if the both corresponding VALID bit, received from write control logic 104a, indicates that the sub-scan line was touched by the primitive at the corresponding x, y coordinate, and if the length_leq_0 signal for that sub-scan line is not asserted; i.e., as long as the overall length of the sub-scan line is greater than zero. Thus, at step 230, VALID<0> is checked to determine if sub-scan line 0 is valid. If so, at step 232, sub-scan line 0 is processed as will be described with regard to FIG. 15, and a Mask signal for sub-scan line 0 is defined as 0001. If sub-scan line 0 is not valid, or after processing sub-scan line 0, the process proceeds to step 234, where VALID<1> and the length value for sub-scan line 1 checked to determine if sub-scan line 1 is valid. If so, at step 236, sub-scan line 1 is processed as described in FIG. 15, with a Mask value of 0010. The process continues through steps 238, 240, 242 and 244 until each of the sub-scan lines of the pixel have been evaluated, with Masks of 0100 and 1000 being provided for sub-scan lines 2 and 3, respectively, if the sub-scan lines are valid.

Figure 15:
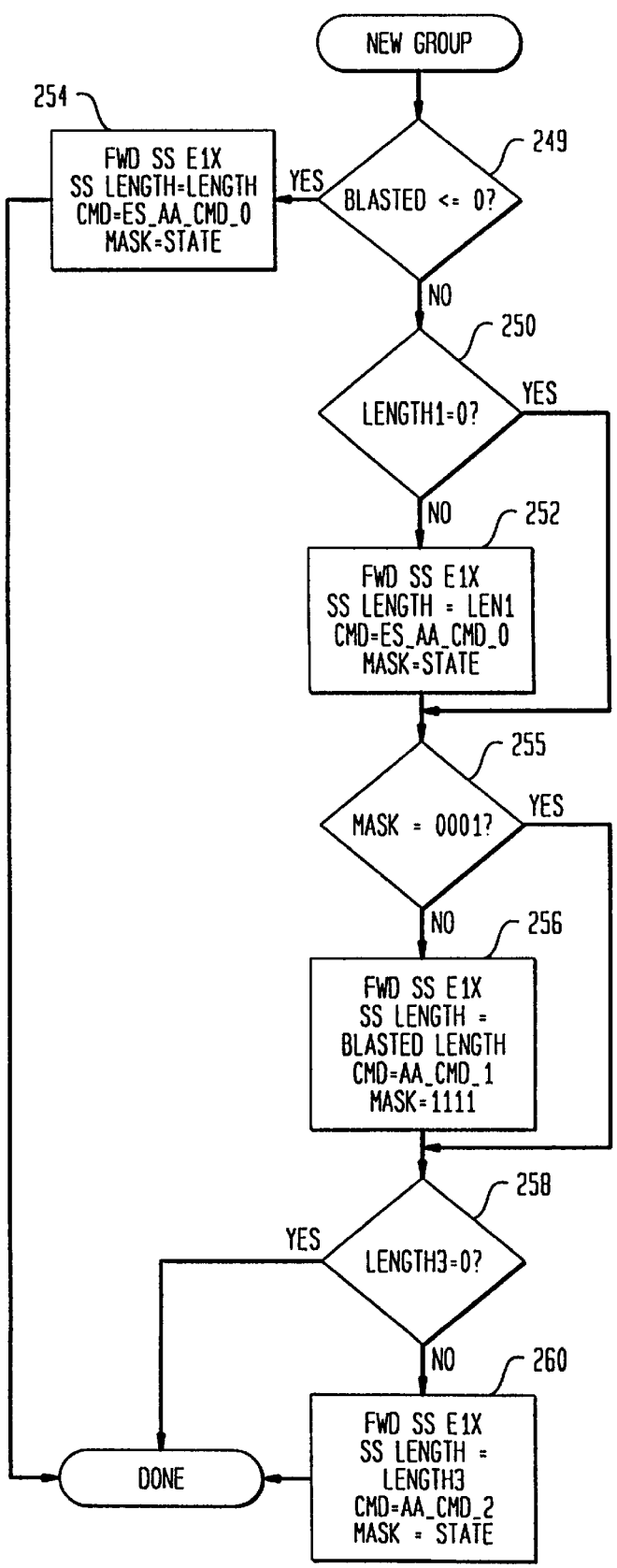
FIG. 15 is a flow diagram illustrating one method of forwarding sub-scan lines in the read control logic of FIG. 14.

Referring now to FIG. 15, a flow diagram illustrating the processing of each sub-scan line by the process of FIG. 14 in the read controller 104b begins when the New Group signal is asserted by the read control logic 104a, thus indicating that a new group of sub-scan lines is ready for processing. At step 249, the status of the blasted_leq_0 signal is checked to determine whether there is a blasted region for the set of sub-scan lines. If the blasted length is less than or equal to zero (i.e., if there is no blasted region), then the process proceeds to step 254, where the read control logic forwards a SS E1X value from buffer 110, a SS Y value from buffer 108, the SS length value from forward unit 130 (by asserting the appropriate mux select signal), the Mask corresponding to the processing state (232, 236, 240 or 244) of the control logic of read control 104b, the color/z data from buffer 114 and a SS CMD signal to the span stepper.

However, if there is a blasted region, the process continues at 250 by checking the len1_leq_0 signal received from the datapath 106. If the len1_leq_0 signal indicates that length1 is equal to zero, then no processing needs to be done for length1, and the process proceeds to step 255. However, if length1 does not equal 0, then the read control forwards a SS E1X value from buffer 110, a SS Y value from buffer 108, the SS length value from forward unit 130 (by asserting the appropriate mux select signal), the Mask corresponding to the processing state (232, 236, 240 or 244) of the control logic of read control 104b, the color/z data from buffer 114 and an SS CMD signal to the span stepper.

In one embodiment, the SS CMD signal has the encodings shown below in Table I:

TABLE I

| | |
|---|---|
| AA_CMD_0 | Before Blasted Region |
| AA_CMD_1 | Continue across blasted region |
| AA_CMD_2 | Continue past blasted region |
| AA_CMD_3 | Skip blasted region |

TABLE I-continued

| | |
|---|---|
| AA_CMD_4 | Start by accumulating blasted region |
| AA_CMD_5 | Start by skipping blasted region |

The SS CMD is used to allow the span stepper to select an appropriate X coordinate address to forward to the memory controller 60. As will be described in more detail below, the SS CMD signal helps the span stepper to identify the next pixel in the sub-scan line that needs to be processed, by directing it to use a previously accumulated E1X, color, Z and texture values, rather than the SS E1X, color Z and texture values provided by the collection logic.

Thus, in the flow diagram of FIG. 15, and using the example of FIG. 11 at scan line 2, sub-scan line 0, if the length1 value was not equal to zero, then at step 252 the read control logic controls the forwarding of the SS E1X, SS Y, SS length, Mask, and SS CMD to the span stepper, with the SS CMD=AA_CMD_0 indicating that the coordinate sent is before a blasted region, and the SS length value is equal to length1, and the mask set to 0001, indicating that sub-scan line 0 is being processed at state 0001 in the process of FIG. 14.

At step 255 it is determined whether the mask equals 0001. Comparing the mask value against 0001 identifies whether or not the blasted region has already been processed, since the mask equals 0000 when the blasted region is processed at sub-scan line zero. According to one embodiment of the invention, the blasted region is only processed once for a group of sub-scan lines to advantageously reduce processing time for the pixel. If it has already been processed, the process proceeds to step 258. If the blasted region has not already been processed, then at step 256 the SS E1X, SS Y and SS length (equal to the blasted length) values are sent to the span stepper. The Mask value that is sent is set to 1111, thus indicating that all subsamples of the pixel are covered. The SS CMD that is sent is AA_CMD_1, indicating that the span stepper should continue across the blasted region, starting at the previously incremented x coordinate (i.e., the x coordinate after processing of length1), and continue incrementing the x coordinate from that point.

The process proceeds to step 258, where the len3_leq_0 signal from the forward unit is checked to determine if there are pixels in length3 of the sub-scanline to be evaluated. If length3 does not equal zero, then at step 260, the SS E1X, SS Y and SS length (equal to length3) values are sent to the span stepper. The Mask value that is sent is set according to the processing state of the process of FIG. 14 that calls the routine of FIG. 15. The SS CMD that is sent is AA_CMD_2, indicating that the span stepper should continue incrementing the x coordinate starting at the x coordinate of the last pixel in the blasted region.

There are other commands that are sent to the span stepper which, for purposes of clarity, have not been described with regard to the flow diagram of FIG. 15. These commands include the AA_CMD_3, to skip the blasted region after starting with length1, the AA_CMD_4, to start by accumulating the blasted region, and the AA_CMD_5, to start by skipping the blasted region. AA_CMD_3 is sent when length1 has been processed, the blasted region has already been processed for a preceding scan line, and length3 is not equal to zero. AA_CMD_3 is sent when length1 is equal to zero, but there is a blasted region to process. AA_CMD_5 is sent when length1 is equal to zero, and the blasted region has already been processed by a previous sub-scan line. Other commands may additionally be included to augment the functionality of the span stepper.

Thus, each cycle of data forwarded from the collection logic to the span stepper includes an SS E1X, SS Y, SS Length, Mask and SS CMD value. The span stepper 56 uses the above signals to determine an address of each pixel that is covered by the primitive. To determine the address of each such pixel, the span stepper steps sequentially from one x coordinate to another along a sub-scan line for the total length of the sub-scan line. If the span stepper determines that a pixel is covered, an x and y coordinate for that pixel is forwarded to memory controller 60, with the pixel y coordinate address that is forwarded being the scan line address for that pixel. In addition, a four bit mask is forwarded to the memory controller 60, with the Mask value corresponding to the Mask signal that is sent from the collection logic. Thus, for a pixel having four sub-scan lines, the span stepper 56 could potentially forward the same x,y coordinate to the memory controller four times, with a different bit in the mask being set for each x,y coordinate transfer.

As mentioned previously, forwarding the same x,y coordinates four times, with different mask bits set, impacts the performance of the anti-aliasing system. Identifying those pixels that are within the blasted region by providing a Mask having all of its bits set reduces the number of transfers between the span stepper and the memory controller, since only one memory transfer is made per pixel.

Because all four bits of the Mask are set in the blasted region, the identification of the blasted region provides a performance improvement when used with the embodiment of the invention wherein it is employed with a memory controller 60 implemented as described in the '350 patent application cited above. As discussed in the patent application, the memory controller 60 is able to process pixels having either only one bit set in their mask, or pixels having all of their bits set in the Mask. If a pixel has a Mask with two or three of the Mask bits set, the pixel coordinates are forwarded from the span stepper logic to the memory controller two or three times, once for each Mask bit set that is set. However, if all four bits are set, the pixel coordinates need only be forwarded once to the memory controller. More details regarding the performance benefits of identifying blasted regions will be provided below.

Figure 16:
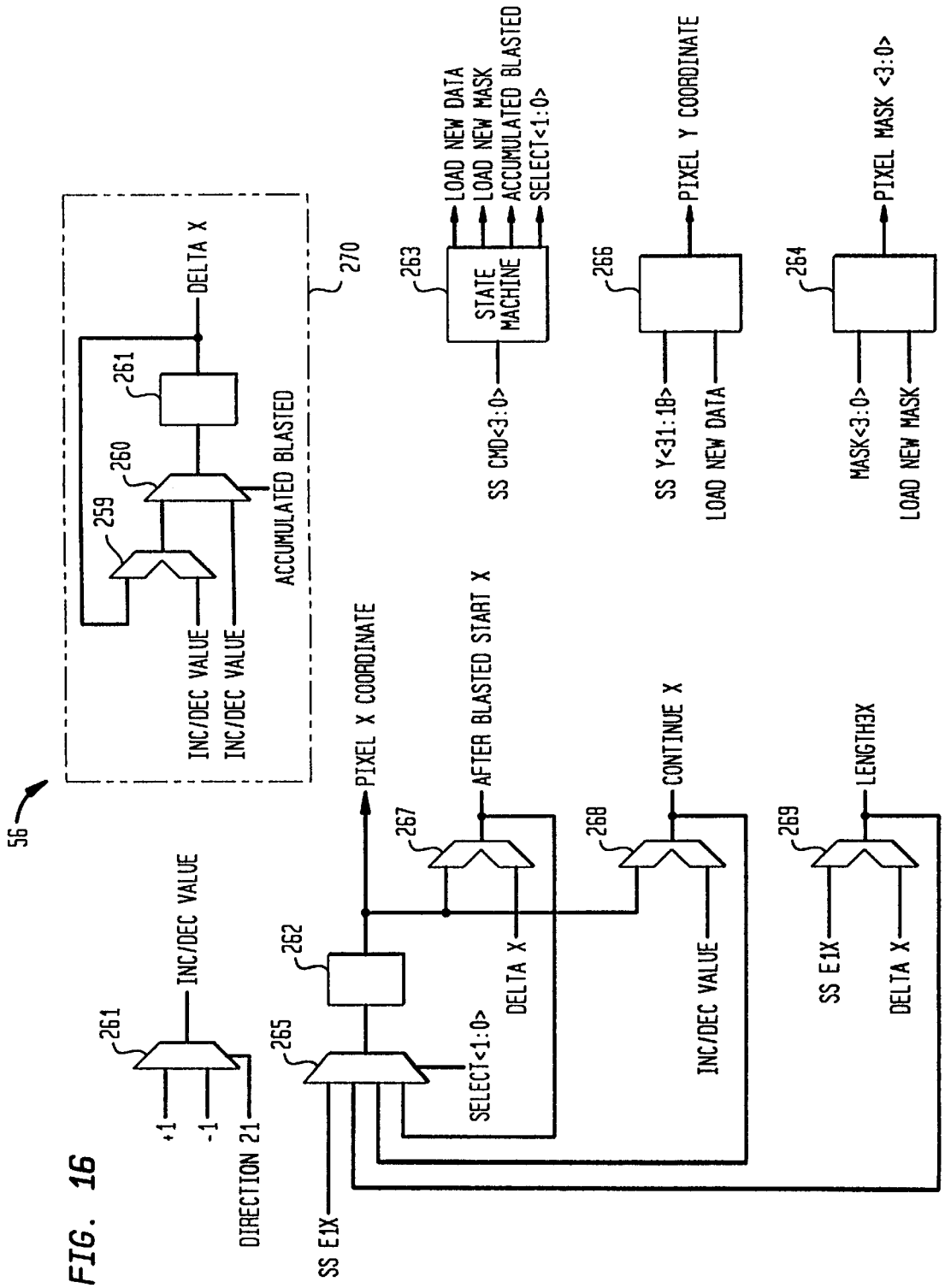
FIG. 16 is a block diagram of one embodiment of a span stepper unit used in the frame buffer controller of FIG. 5 in accordance with the present invention.

Referring now to FIG. 16, a block diagram of the span stepper logic 56 is shown. The span stepper steps in given direction, from edge one to edge two, along the x coordinate axis as indicated by the direction signal. The direction signal is used to control a multiplexer 262 to provide either a +1 or a −1 value for the Inc/dec value signal. The SS CMD signal is forwarded from control unit 104 (FIG. 10) to state machine 263, which decodes the SS CMD into the following signals: Load New Data for controlling the loading of the SS Y coordinate into register 266, Load New Mask for controlling the loading of the Mask into register 264, a signal Accumulate Blasted for controlling the incrementing of blasted count logic 270, and select<1:0> signals that are used to control the selection of an x coordinate at a multiplexer 265.

The span stepper operates generally as follows. When the SS E1X, SS Y and SS CMD signals are received at the span stepper, values for the control signals Load New Data, Load New Mask, Accumulate Blasted, and select<1:0> are generated by the state machine 263. The select<1:0> signals select one of four x coordinates input to multiplexer 265, and the multiplexer forwards the selected input to register 262 to be provided as the Pixel X coordinate to the memory controller 60.

The four inputs to the multiplexer 265 include the SS E1X coordinate received from the collection logic 54, an After Blasted Start X coordinate, a Continue X coordinate and a Length3 X coordinate. Referring again to Table I, the status of the SS CMD indicates which x-coordinate the span stepper uses as a starting coordinate for span stepping. For example, if the SS CMD decodes to AA_CMD_0, indicating that the span stepping should begin at the start of length1, then the SS E1X coordinate is selected by multiplexer 265. If the SS CMD decodes to AA_CMD_1, indicating span stepping should continue counting from the end of length1 across the blasted region, the Continue X coordinate is selected by multiplexer 265. The Continue X coordinate is also selected if the SS CMD decodes to AA_CMD_2, indicating that counting continues from the end of the blasted region into length3. If the SS CMD decodes to AA_CMD_3, indicating that the span stepper should start stepping after length1, but skip the blasted region, the After Blasted X coordinate is selected by multiplexer 265. If the SS CMD decodes to AA_CMD_4, indicating that the span stepper should start stepping at the blasted region because the length1 is less than or equal to zero, the SS E1X coordinate is selected. If the SS CMD decodes to AA_CMD_5, indicating that the span stepper should start stepping after the blasted region because the blasted region has previously been processed, the Length3 X coordinate is selected by multiplexer 265.

The After Blasted Start X and Length3 X coordinates are provided by adders 267 and 269, respectively. The other input to adders 267 and 269 is a Delta X input. The Delta X input is provided by the blasted counter 270 and indicates the change in the x coordinate across the blasted region. The Delta X value is initialized by multiplexer 260, which forwards the Inc/Dec value received from multiplexer 262 to the register 261 for initialization purposes. When the Accumulate Blasted signal is asserted (i.e., when the SS CMD equals AA_CMD_1 or AA_CMD_4), the multiplexer 260 switches to select the output from adder 259 for forwarding to the register 261. The adder increments (or decrements) the Delta X value for each cycle that a Pixel X coordinate is provided during processing of the blasted region. When the Accumulate Blasted signal is deasserted, the Delta X value that is saved in register 261 represents the magnitude of change in value of the x coordinate as stepping proceeded across the blasted region.

Accumulation logic similar to blasted counter 270 may also be provided for tracking and saving the total change of color and texture across a sub-scan line. The accumulation logic, rather than providing a ±1 value to the input of the adder, would instead increment according to a delta color and delta texture parameter derived as part of the edge equation in software to determine a total change in color or texture across the sub-scan line.

The operation of the span stepper 56 will now be described with reference to span stepping across scan line two of the example primitive 150 of FIG. 11. During the first span stepping cycle, as described above, the SS E1X, SS Y coordinates are (5,2), the SS length value is a one, the Mask is equal to 0001, and the SS CMD causes the SS E1X coordinate to be forwarded through multiplexer 265, loaded in register 262 and output as Pixel X coordinate. The Pixel X coordinate is forwarded to adder 267 and 268. Because the SS length value was a one, and one Pixel X coordinate was output, in the next cycle, the SS E1X, SS Y, Mask, SS length and SS CMD corresponding to the blasted region 152 are received.

Using the example primitive of FIG. 11, the received SS CMD for processing the blasted region of sub-scan line 0 equals AA_CMD_1. The AA_CMD_1 command causes the Load New Mask, Load New Data and Accumulate Blasted signals to be asserted. As mentioned above, the AA_CMD_1 value for the SS CMD causes the Continue X coordinate to be selected for stepping. The Continue X coordinate is obtained by decrementing the Pixel X coordinate (by adding a negative one value to the Pixel X coordinate since the step direction is right to left), stored in register 262 and output as Pixel X coordinate (4,2). The Mask stored in register 264 is equal to 1111, as described in step 256 of FIG. 15. The Continue X coordinate continues to be selected for each pixel in the blasted region. At the same time, the Delta X value counts the magnitude of change of the x coordinate across the blasted region. Thus, in the next cycle, a Pixel X,Y coordinate of (3,2) is generated, with a Mask of 1111. After the second Pixel X, Y coordinate pair and associated mask has been forwarded to the memory controller, the stepping of the blasted region is complete and the stored Delta X value is equal to two.

In the example of FIG. 11, once the blasted region 152 has been processed for sub-scan line 0, since length3 of sub-scan line 0 equals zero, processing continues at sub-scan line 1. During the first cycle of processing of sub-scan line 1, length1 equals zero, so processing would begin with the blasted region. But the blasted region has already been processed. Thus, the first coordinates that are forwarded are SS E1X, SS Y, Mask, SS length (of length3), and the SS CMD=AA_CMD_5, indicating to start by skipping the blasted region. The select<1:0> signals are set to select the Length3 X coordinate from adder. Thus, for sub-scan line 1, the first Pixel X,Y coordinates that are forwarded to the memory controller are (2,2). The Pixel Mask that is forwarded is indicated by the processing state of the process of FIG. 14 at step 236, and is thus a 0010 for this example.

Thus, in one embodiment of the invention, the Mask is forwarded either with only one bit set, or with all of the bits set. The Mask bits are forwarded in the above manner because the embodiment of the memory controller described in the above referenced patent application only has the capacity to process the pixel data either as discrete sub-pixels or as an entire pixel. Thus, the identification of the blasted region, while improving the performance of the span stepper unit 58, also improves the overall memory performance by allowing those pixel coordinates that may be handled as full pixel updates to be identified and quickly transferred to memory for processing.

It should be noted, however, that the present invention is not limited to transferring subsample information as either a full four-bit mask, or as a single-bit mask. This effect is merely a constraint of the memory controller 60 used in one embodiment of the invention. When used with another memory controller that can support the receipt of mask data with greater than one but less than all bits set, the mask for each pixel could be sent directly from the span stepper logic in a single transfer.

Thus, a method and apparatus has been described that allows for anti-aliasing to be supported with only slight modifications to existing hardware. By subdividing a scan line into a plurality of sub-scan lines, and performing edge stepping along sub-scan line boundaries, subsample information may be gleaned during a conventional edge stepping process using conventional hardware.

It should be understood that various changes and modification of the embodiments shown in the drawings and described in the specification may be made within the scope of the invention. It is intended that all matter contained in the above-description and shown in the accompanying drawings be interpreted in an illustrative and not in a limiting sense. The invention is only limited as defined in the following claims and their equivalence thereto.

What is claimed is:

1. A method of determining a percentage of at least one pixel on a graphics system display screen that is covered by a primitive to be displayed on the display screen, the method comprising the steps of:

(a) apportioning the at least one pixel into a plurality of sub-scan lines that define a plurality of subsample points for the at least one pixel, each of the plurality of subsample points being located on a corresponding one of the plurality of sub-scan lines;

(b) stepping between the plurality of sub-scan lines of the at least one pixel;

(c) determining, at each one of the plurality of sub-scan lines, whether the corresponding subsample point on the one of the plurality of sub-scan lines is covered by the primitive; and (d) approximating the percentage of the at least one pixel covered by the primitive based upon the number of the plurality of subsample points of the at least one pixel that are covered by the primitive.

2. The method according to claim 1, wherein the primitive includes a plurality of edges, and wherein step (c) comprises steps of:

determining, for each one of the plurality of edges of the primitive, x and y coordinates of each intersection wherein one of the plurality of edges of the primitive crosses the one of the plurality of sub-scan lines; and determining, responsive to the x and y coordinates of each intersection and x and y coordinates of the subsample point located on the one of the plurality of sub-scan lines, whether the subsample point located on the one of the plurality of sub-scan lines is covered by the primitive.

3. The method according to claim 2, wherein the step of determining x and y coordinates of each intersection further comprises steps of:

determining, in software, start coordinates and slopes for each edge of the primitive;

stepping along each one of the plurality of edges beginning at the start coordinates for the one of the plurality of edges; and determining the x coordinate of each one of the edges for each y coordinate corresponding to one of the plurality of sub-scan lines responsive to a slope of the each edge.

4. The method according to claim 1, further comprising steps of:

identifying, for the plurality of sub-scan lines, pixels in the primitive having all of the respective subsamples of each of the sub-scan lines covered by the primitive; and transferring said pixels having all of said plurality of subsample points covered by the primitive to a memory controller in a single transfer operation.

5. The method according to claim 1, wherein the step (a) of apportioning further comprises a step of scaling the image by a predetermined amount, such that each of the plurality of sub-scan lines falls on an integer address boundary of the scaled image.

6. The method according to claim 5, wherein the predetermined amount is a multiple of the number of subsamples of the pixel.

7. The method according to claim 1, wherein the step (a) comprises the step of apportioning the at least one pixel into four sub-scan lines that define four subsamples.

8. The method according to claim 1, wherein the coordinates of the subsamples on the sub-scan line are selected such that the subsamples form a non-regular pattern in the pixel.

9. In a graphics system capable of rendering a primitive, an edge stepper for generating coordinate data for display pixels on a display device that represent the primitive, the edge stepper receiving edge equation data including a first and second pair of endpoint coordinates and a slope value for at least one edge of the primitive to be rendered, the edge stepper comprising:

an adder, for incrementing one of the first endpoint coordinates by an increment value to provide an edge x and an edge y coordinate of the at least one edge of the primitive being rendered, wherein the increment value is less than a size of a display pixel in one mode of operation.

10. The edge stepper according to claim 9, wherein the increment value is selected from a first group of increment values when the edge stepper operates in an aliased mode, and is selected from a second group of increment values when the edge stepper operates in an anti-aliased mode.

11. The edge stepper according to claim 9 wherein each pixel of the primitive is apportioned into a plurality of sub-scan lines when the edge stepper operates in an anti-aliased mode and wherein the second group of increment values includes increments for stepping between the plurality of sub-scan lines.

12. The edge stepper according to claim 11, wherein the edge stepper further comprises means for approximating a percentage of each pixel that is covered by the primitive.

13. The edge stepper according to claim 12, wherein the means for determining a percentage of each pixel that is covered by a primitive further comprises:

means for determining, for each edge, an x direction indicating a direction towards an opposing edge of the primitive; and a comparator, coupled to receive the edge x and edge y coordinates for each sub-scan line and to compare the edge x and edge y coordinates against coordinates of a subsample located on the sub-scan line to determine, responsive to x direction, whether the subsample is covered by the primitive.

14. A graphics device for displaying an image on a display device based on data received from a host processor, the display device comprising a plurality of scan lines, each of the scan lines comprising a plurality of pixels, the graphics device comprising:

a graphics accelerator, coupled to receive data from the host processor representing a plurality of graphics primitives, the graphics accelerator generating edge equations for each primitive, the edge equations including, for at least one edge of the primitive, endpoint coordinate data identifying endpoints of the at least one edge of the primitive and slope data identifying a rate of change of the at least one edge;

a scan converter, coupled to the graphics accelerator, that translates the edge equations into coordinates of pixels of the display device, the scan converter including an edge stepper to step from one of the coordinates of one of the endpoints of the at least one edge to another endpoint of the at least one edge to generate pixel coordinates for the edge, wherein a size of step of the edge stepper is less than a size of a display pixel.

15. The graphics device according to claim 14, wherein the size of the step is varies according to a mode of operation of the graphics device.

16. The graphics device according to claim 14, wherein the edge stepper steps according to a scan line granularity for operation in an aliased mode, and wherein the edge stepper steps according to a sub-scan line granularity for operation in an anti-aliased mode.

17. The graphics device according to claim 15, further comprising:

means for apportioning the scan lines into a plurality of sub-scan lines; and said edge stepper for sampling each pixel at a plurality of subsamples locations, with each subsample located on one of the sub-scan lines.

18. The graphics device according to claim 17, wherein the means for apportioning further comprises scaling means for scaling the image during anti-aliasing operations such that each of the plurality of sub-scan lines falls on an integer coordinate address of the scaled image.

19. The graphics device according to claim 17, further comprising means for determining, as the edge stepper steps along each sub-scan line in anti-aliased mode, whether a subsample located on the sub-scan line is covered by the primitive.

20. The graphics device according to claim 19, wherein the scan converter further comprises:

means, at said edge stepper, for generating a status signal indicative of whether said subsample located on the sub-scan line is covered by the primitive; and a collection unit, coupled to the edge stepper unit, to collect edge coordinate data and the status signal for each sub-scan line coordinate that is generated by the edge stepper, and to generate, for each of a group of sub-scan lines of the pixel, a mask indicating a percentage of coverage of the pixel by the primitive.

21. A method of simplifying a mathematical calculation in an antialiasing operation for antialiasing an image displayed on a display screen, the mathematical calculation operating on at least one piece of information relating to the image, the information having an integer component and a fractional component, the method including steps of:

scaling the image by an amount such that the at least one piece of information has only an integer component and does not have a fractional component; and performing the mathematical calculation during the anti-aliasing operation based on the at least one piece of information that has only an integer component.

22. A method of simplifying a mathematical calculation in an antialiasing operation for antialiasing an image displayed on a display screen, the mathematical calculation operating on at least one piece of information relating to the image, the information having an integer component and a fractional component, the method including a step of:

scaling the image by an amount such that the at least one piece of information operated upon by the mathematical calculation during the antialiasing operation has only an integer component and does not have a fractional component;

wherein the method of simplifying a mathematical calculation is employed in a multi-point sampling antialiasing operation, wherein the display screen includes a plurality of pixels and wherein the at least one piece of information relating to the image comprises at least one subsample point for each of the plurality of pixels, the at least one subsample point lying on a non-integer pixel boundary of the display screen, wherein the step of scaling provides a scaled representation of the image in which each of the plurality of subsamples falls on an integer address boundary of the display screen.

* * * * *

UNITED STATES PATENT AND TRADEMARK OFFICE
CERTIFICATE OF CORRECTION

PATENT NO.     : 6,057,855                                                  Page 1 of 1
DATED          : May 2, 2000
INVENTOR(S)    : Anthony C. Barkans It is certified that error appears in the above-identified patent and that said Letters Patent is hereby corrected as shown below:

Column 26,
Line 66, delete " step is varies" and insert therefor -- step varies --

Signed and Sealed this

Eleventh Day of June, 2002

Attest:

JAMES E. ROGAN
Attesting Officer     Director of the United States Patent and Trademark Office